(12) United States Patent
Nara et al.

(10) Patent No.: US 8,023,781 B2
(45) Date of Patent: Sep. 20, 2011

(54) BROADBAND WAVELENGTH MULTIPLEXING AND DEMULTIPLEXING FILTER AND OPTICAL SPLITTER WITH OPTICAL SIGNAL MULTIPLEXING AND DEMULTIPLEXING FUNCTION

(75) Inventors: Kazutaka Nara, Tokyo (JP); Haruki Urabe, Tokyo (JP); Tsunetoshi Saitoh, Tokyo (JP); Masahito Morimoto, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/983,637

(22) Filed: Jan. 3, 2011

(65) Prior Publication Data

US 2011/0097035 A1    Apr. 28, 2011

Related U.S. Application Data

(62) Division of application No. 12/324,205, filed on Nov. 26, 2008, now Pat. No. 7,885,493, which is a division of application No. 10/560,132, filed as application No. PCT/JP2005/001295 on Jan. 25, 2005, now Pat. No. 7,469,079.

(30) Foreign Application Priority Data

Jan. 26, 2004  (JP) ................... 2004-016589
Jun. 25, 2004  (JP) ................... 2004-188365
Jul. 29, 2004  (JP) ................... 2004-222250

(51) Int. Cl.
    *G02B 6/12* (2006.01)
(52) U.S. Cl. ............. 385/14; 385/15; 385/24
(58) Field of Classification Search .............. None
See application file for complete search history.

(56) References Cited

U.S. PATENT DOCUMENTS

| 5,596,661 A | 1/1997 | Henry et al. |
| 6,724,954 B2 | 4/2004 | Arai et al. |

(Continued)

FOREIGN PATENT DOCUMENTS

JP    5-196827    8/1993

(Continued)

OTHER PUBLICATIONS

Kaname Jinguji et al., Two-Port Optical Wavelength Circuits Composed of Cascaded Mach-Zehnder Interferometers with Point-Symmetrical Configurations, Journal of Lightwave Technology, vol. 14, No. 10, Oct. 1996, pp. 2301-2310.

(Continued)

*Primary Examiner* — Tina Wong
(74) *Attorney, Agent, or Firm* — Oblon, Spivak, McClelland, Maier & Neustadt, L.L.P.

(57) ABSTRACT

Two Mach-Zehnder optical interferometer circuits are accurately point-symmetrically connected to each other to form a first point-symmetrically connected optical interferometer circuit constituting a light input side circuit. Optical signals having a plurality of wavelengths are input to a light input terminal. A second point-symmetrically connected optical interferometer circuit having the same functional structure as the first point-symmetrically connected optical interferometer circuit is connected to a through port, which is an output terminal of the light input side circuit, as a first light output side circuit. A cross port, which is the other output terminal of the light input side circuit, is connected to a second light output side circuit having at least one of Mach-Zehnder optical interferometer circuits whose transmittance characteristics are different from those of the Mach-Zehnder optical interferometer circuits.

8 Claims, 22 Drawing Sheets

U.S. PATENT DOCUMENTS

| | | | |
|---|---|---|---|
| 2002/0181857 A1* | 12/2002 | Komatsu et al. | 385/24 |
| 2004/0120640 A1 | 6/2004 | Hatayama et al. | |
| 2011/0085761 A1 | 4/2011 | Nara et al. | |

FOREIGN PATENT DOCUMENTS

| | | |
|---|---|---|
| JP | 5-232333 | 9/1993 |
| JP | 6-242333 | 9/1994 |
| JP | 08-234050 | 9/1996 |
| JP | 10-282350 | 10/1998 |

OTHER PUBLICATIONS

Hida, Yasuhiro et al., The IEICE Transactions C-I, vol. J80-C-I, No. 11, p. 517-524, Nov. 1997 (w/ partial English translation).

Nara, Kazutaka et al., Proceedings of the 2004 IEICE Electronics Society Conference 1, Sep. 8, 2004, p. 174 (w/ partial English translation).

U.S. Appl. No. 13/015,218, filed Jan. 27, 2011, Nara.

* cited by examiner

WAVELENGTH (nm)

WAVELENGTH (nm)

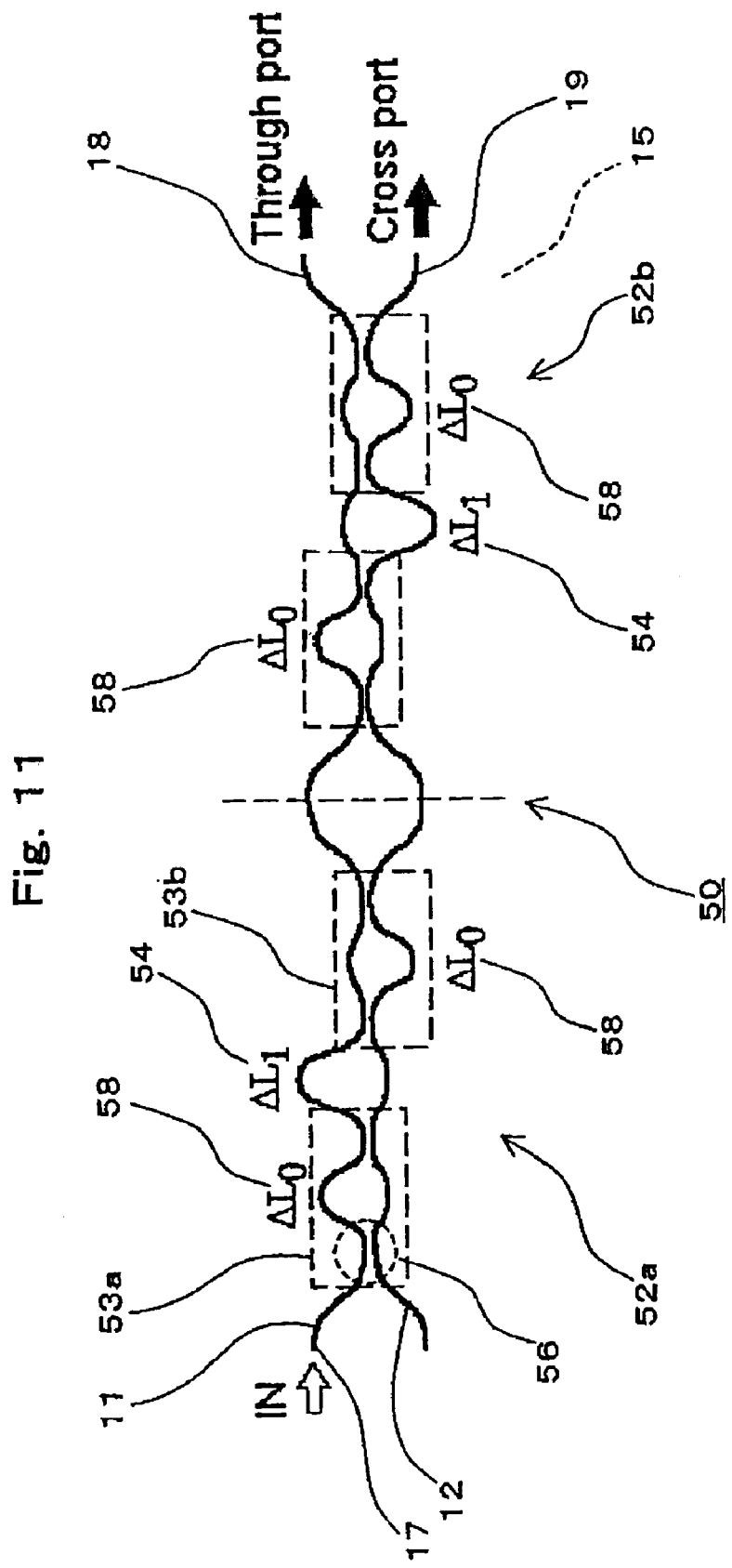

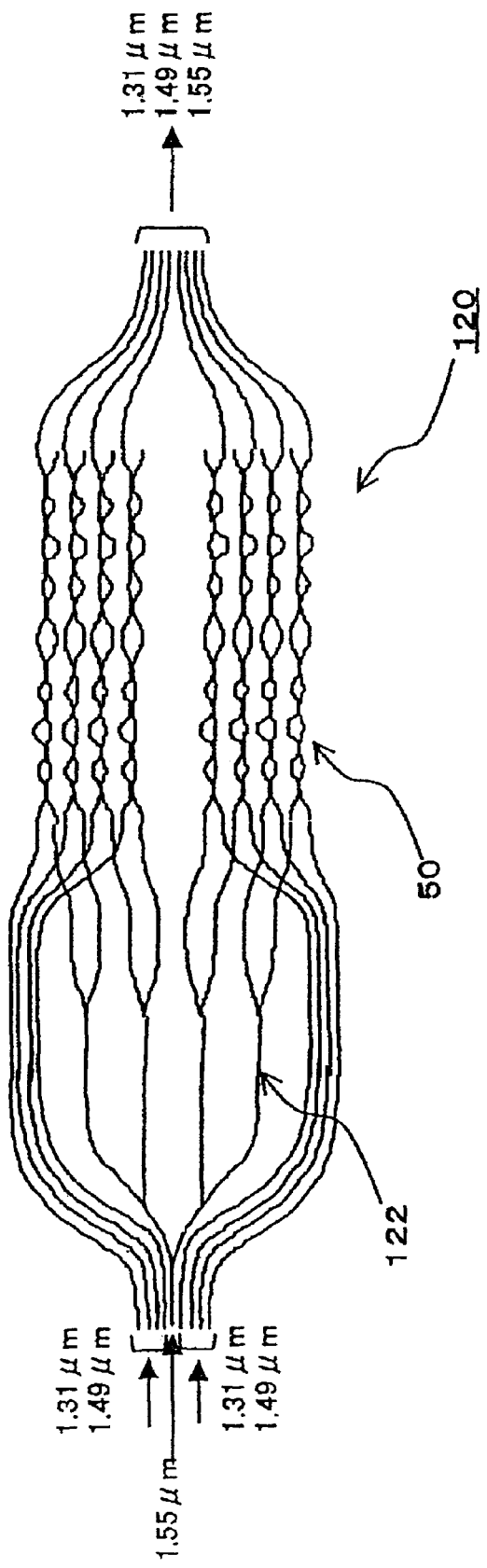

BROADBAND WAVELENGTH MULTIPLEXING AND DEMULTIPLEXING FILTER AND OPTICAL SPLITTER WITH OPTICAL SIGNAL MULTIPLEXING AND DEMULTIPLEXING FUNCTION

CROSS-REFERENCE TO RELATED APPLICATIONS

This application is a division of U.S. application Ser. No. 12/324,205, filed Nov. 26, 2008, which is a division of and is based upon and claims the benefit of priority under 35 U.S.C. §120 for U.S. application Ser. No. 10/560,132, filed Dec. 9, 2005, which is a National Stage of PCT/JP05/01295 filed Jan. 25, 2005, and claims the benefit of priority under 35 U.S.C. §119 from Japanese Patent Application No. 2004-016589, filed Jan. 26, 2004 and Japanese Patent Application No. 2004-188365, filed Jun. 25, 2004 and Japanese Patent Application No. 2004-222250, filed Jul. 29, 2004. The entire contents of which are incorporated herein by reference.

TECHNICAL FIELD

The present invention relates to a broadband wavelength multiplexing and demultiplexing filter and an optical splitter with an optical signal multiplexing and demultiplexing function used for, for example, an optical communication field.

BACKGROUND ART

In recent years, an Internet has been popularized in home, and high-speed and cheap communication services, in which a constant connection has been made by ADSL or FTTH, of which a transmission speed is several Mbps, and of which a monthly subscription is several tens of dollars, have been provided. Further, with the spread of broadband communication, a large amount of contents have been distributed, and a video chat has come into wide use.

With the spread of broadband communication, a B-PON system capable of providing high-speed data communication having a data transmission speed of 100 Mbps at a peak time and of simultaneously distributing multi-channel (for example, a maximum of 500 channels) image signals using one optical fiber has been used as an international standard of ITU-T. The structure of this system is shown in FIG. 26 (for example, see an outline of the B-PON system described in the home page of an NTT-AS institute).

Further, in FIG. 26, a communication station 40 is connected to a user home 41 through a communication optical fiber 45. In FIG. 26, B-ONU indicates a data-based subscriber station apparatus for data, WDM indicates an optical coupler, V-ONU indicates an image-based subscriber station apparatus, NE-OSS indicates a data-based monitor control apparatus, B-OLT indicates a data-based service station apparatus, EMDX indicates an Ether demultiplexing apparatus, and V-OLT indicates an image-based service station apparatus.

The salient characteristic of this system is that one optical wavelength is added to two wavelengths used for the transmission and reception of high-speed data by an additional optical wavelength arrangement and thus the distributed multi-channel images can be simultaneously seen. In general, wavelengths of high-speed data communication signals to be transmitted and received are included in a wavelength band of 1.49 μm (1.48 μm to 1.50 μm) or a wavelength band of 1.31 μm (1.26 μm to 1.36 μm), and an image is distributed at a wavelength band of 1.55 μm (1.55 μm to 1.56 μm), which is an amplifying band of EDFA.

Since optical signals having three types of wavelengths are transmitted through one optical fiber, the B-PON system requires a wavelength multiplexing and demultiplexing function having an optical signal multiplexing and demultiplexing function (the multiplexing and demultiplexing of optical signals having a plurality of wavelengths) and a function of distributing image signals with the same intensity. Conventionally, a dielectric multi-layer filter has been used as an optical component having the wavelength multiplexing and demultiplexing function. An optical component having the wavelength multiplexing and demultiplexing function requires a broadband wavelength multiplexing and demultiplexing characteristic and a high-isolation characteristic greater than, for example, 25 dB, and a development of such a broadband wavelength multiplexing and demultiplexing filter is demanded.

Further, since optical signals having three types of wavelengths are transmitted through one optical fiber, the B-PON system requires an optical signal multiplexing and demultiplexing device having an optical signal multiplexing and demultiplexing function (the multiplexing and demultiplexing of optical signals having a plurality of wavelengths) and an optical splitter for splitting image signals at the same intensity.

Accordingly, an object of the present invention is to provide a broadband wavelength multiplexing and demultiplexing filters improved for or capable of meeting the above-mentioned requirements. In addition, another object of the present invention is to provide an optical splitter with an optical signal multiplexing and demultiplexing function, which is suitable for a B-PON system, etc.

DISCLOSURE OF INVENTION

According to a first aspect, the present invention has a following structure. That is, a broadband wavelength multiplexing and demultiplexing filter according to an embodiment of the present invention comprises: Mach-Zehnder optical interferometer circuits each having directional couplers formed on a substrate by a first optical waveguide and a second optical waveguide provided in parallel to each other with a gap in a lengthwise direction of the optical waveguides therebetween, and a phase part interposed between the directional couplers; a first point-symmetrically connected optical interferometer circuit formed by accurately point-symmetrically connecting two equal Mach-Zehnder optical interferometer circuits in series; and a light input side circuit formed by connecting one or more first point-symmetrically connected optical interferometer circuits in series, wherein a light input terminal of a first optical waveguide of the light input side circuit is composed of an input port for optical signals having a plurality of wavelengths, and an output terminal of the first optical waveguide is composed of a through port; an output terminal of a second optical waveguide of the light input side circuit is composed of a cross port; a first light output side circuit formed by serially connecting one or more second point-symmetrically connected optical interferometer circuits having the same functional structure as the first point-symmetrically connected optical interferometer circuit is connected to the through port; and a second light output side circuit including one or more Mach-Zehnder optical interferometer circuits having transmission characteristics different from those of the Mach-Zehnder optical interferometer circuits constituting the first and the second point-symmetrically connected optical interferometer circuits is connected to the cross port.

Further, a broadband wavelength multiplexing and demultiplexing filter according to another embodiment of the present invention comprises: Mach-Zehnder optical interferometer circuits each having two directional couplers on a substrate, each directional coupler formed by a first optical waveguide and a second optical waveguide provided in parallel to each other with a gap therebetween, and a phase-part-intervention-type point-symmetrically connected optical interferometer circuit formed by point-symmetrically arranging two equal Mach-Zehnder optical interferometer circuits in series and connecting them to each other with a phase part for generating a predetermined phase change interposed therebetween, two equal phase-part-intervention-type point-symmetrically connected optical interferometer circuits being accurately point-symmetrically connected in series; wherein the Mach-Zehnder optical interferometer circuits have equal directional couplers, and these directional couplers are connected in series to each other with a second phase part for generating a phase change different from that in the phase part interposed therebetween.

Furthermore, an optical splitter with an optical signal multiplexing and demultiplexing function according to still another embodiment of the present invention comprises: an optical waveguide circuit formed on a substrate, wherein the optical waveguide circuit comprises: an optical splitter for splitting an optical signal input from a light input port provided at one end of the optical waveguide circuit into a plurality of optical signals having the same intensity and for outputting them from a plurality of light output ports; and a plurality of optical signal multiplexing and demultiplexing devices arranged in parallel to each other, each being provided with two light input ports and having a function of demultiplexing optical signals having different wavelengths input from the light input ports, wherein one input port of each of the optical signal multiplexing and demultiplexing devices is connected to the corresponding light output port of the optical splitter; the other light input port of each of the optical signal multiplexing and demultiplexing devices is provided at one end side of the optical waveguide circuit to be parallel to the light input port of the optical splitter; and a multiplexed optical signal output port of each of the optical signal multiplexing and demultiplexing devices is provided at an end portion side other than a region where the light input port of the optical waveguide circuit is provided.

BRIEF DESCRIPTION OF THE DRAWINGS

FIG. 11 is an essential constitutional view schematically illustrating a circuit structure of a third embodiment of the broadband wavelength multiplexing and demultiplexing filter of the present invention;

FIG. 21 is an explanatory diagram illustrating a structure of an optical splitter with a broadband wavelength multiplexing and demultiplexing filter function of a seventh embodiment using the broadband wavelength multiplexing and demultiplexing filter according to the present invention;

BEST MODE FOR CARRYING OUT THE INVENTION

Figure 2:
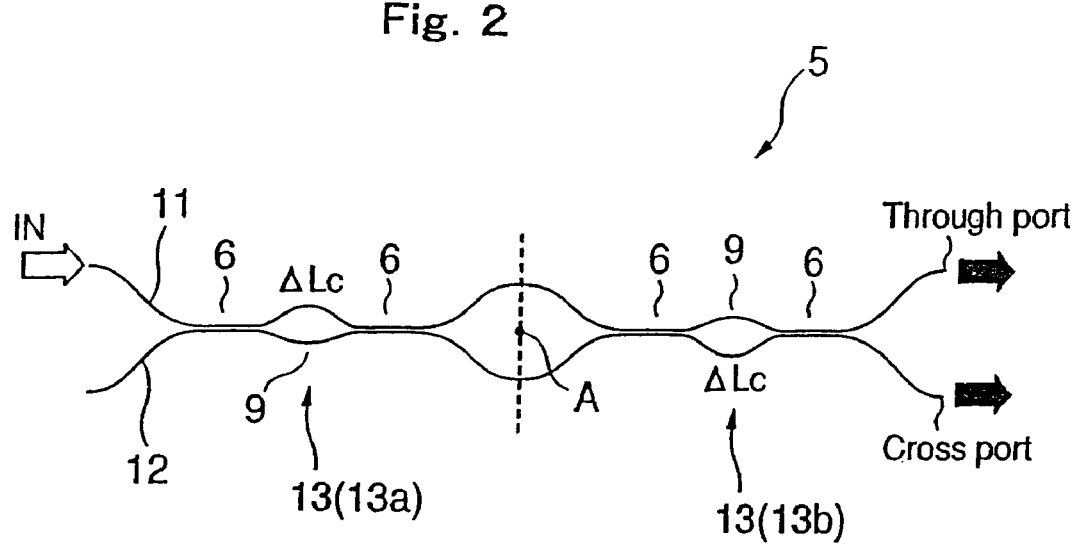
FIG. 2 is an explanatory diagram schematically illustrating a circuit structure of a point-symmetrically connected optical interferometer circuit.

A circuit having a structure shown in FIG. 2 has been known as an example of an optical component having a broadband wavelength multiplexing and demultiplexing characteristic (for example, see Jinguji, et al., "Two-port optical wavelength circuits composed of cascaded Mach-Zehnder interferometers with point-symmetrical configurations", J. Lightwave Technol., vol. 14, No. 10, pp. 2301-2310 (1996)).

This circuit has two equal Mach-Zehnder optical interferometer circuits 13 (13a and 13b). Each Mach-Zehnder optical interferometer circuit 13 (13a or 13b) has directional couplers 6 each composed of a first optical waveguide 11 and a second optical waveguide 12 provided in parallel to the first optical waveguide 11 with a gap therebetween, and the directional couplers 6 are respectively arranged in the lengthwise direction of the optical waveguide with a gap therebetween. These two Mach-Zehnder optical interferometer circuits 13 (13a and 13b) are connected in series to each other so as to be exactly point-symmetric with respect to a central point A of the connection to form a point-symmetrically connected optical interferometer circuit 5.

That is, the arrangement pitch between the directional couplers 6 in one Mach-Zehnder optical interferometer circuit 13 (13a or 13b) is equal to that of the other Mach-Zehnder optical interferometer circuit 13 (13a or 13b), and in one Mach-Zehnder optical interferometer circuit 13a, the length of a phase part 9 of the first optical waveguide 11 is larger than that of the second optical waveguide 12 by a predetermined length. On the other side, in the other Mach-Zehnder optical interferometer circuit 13b, the length of the phase part 9 of the second optical waveguide 12 is larger than that of the first optical waveguide 11 by the predetermined length.

Figure 27:
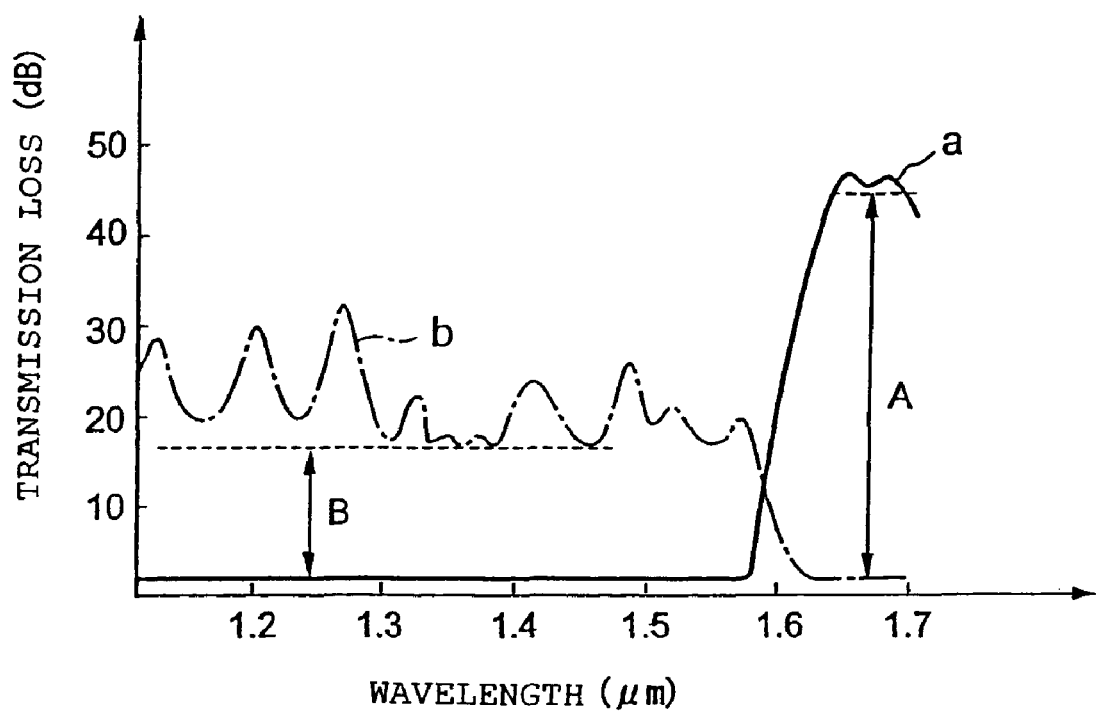
FIG. 27 is a graph showing a transmission characteristic and a reflection characteristic of a dielectric multi-layer filter.

Therefore, as shown in FIG. 27, in a conventional dielectric multi-layer filter applied to a B-PON system, the isolation of a non-reflection band of reflected light (which is represented by a feature line b) to a transmission band of transmission light (which is represented by a feature line a) is high (see a character 'A' of FIG. 27). On the other hand, the isolation of a reflection band of the reflected light to a non-transmission band of the transmission light deteriorates largely (see a character 'B' of FIG. 27). These features cannot satisfy a high isolation characteristic currently being required.

Further, when the dielectric multi-layer filter is integrated into a module, a micro optics technique using a lens system is applied thereto. Therefore, the part price is not lowered, and thus it is difficult to reduce manufacturing costs.

Furthermore, the point-symmetrically connected optical interferometer circuit shown in FIG. 2 is designed only to have a broadband wavelength multiplexing and demultiplexing characteristic. Therefore, it is difficult for the circuit to obtain a high isolation characteristic.

First Embodiment

A broadband wavelength multiplexing and demultiplexing filter according to an embodiment of the present invention is designed to solve the above-mentioned problems.

Figure 1:
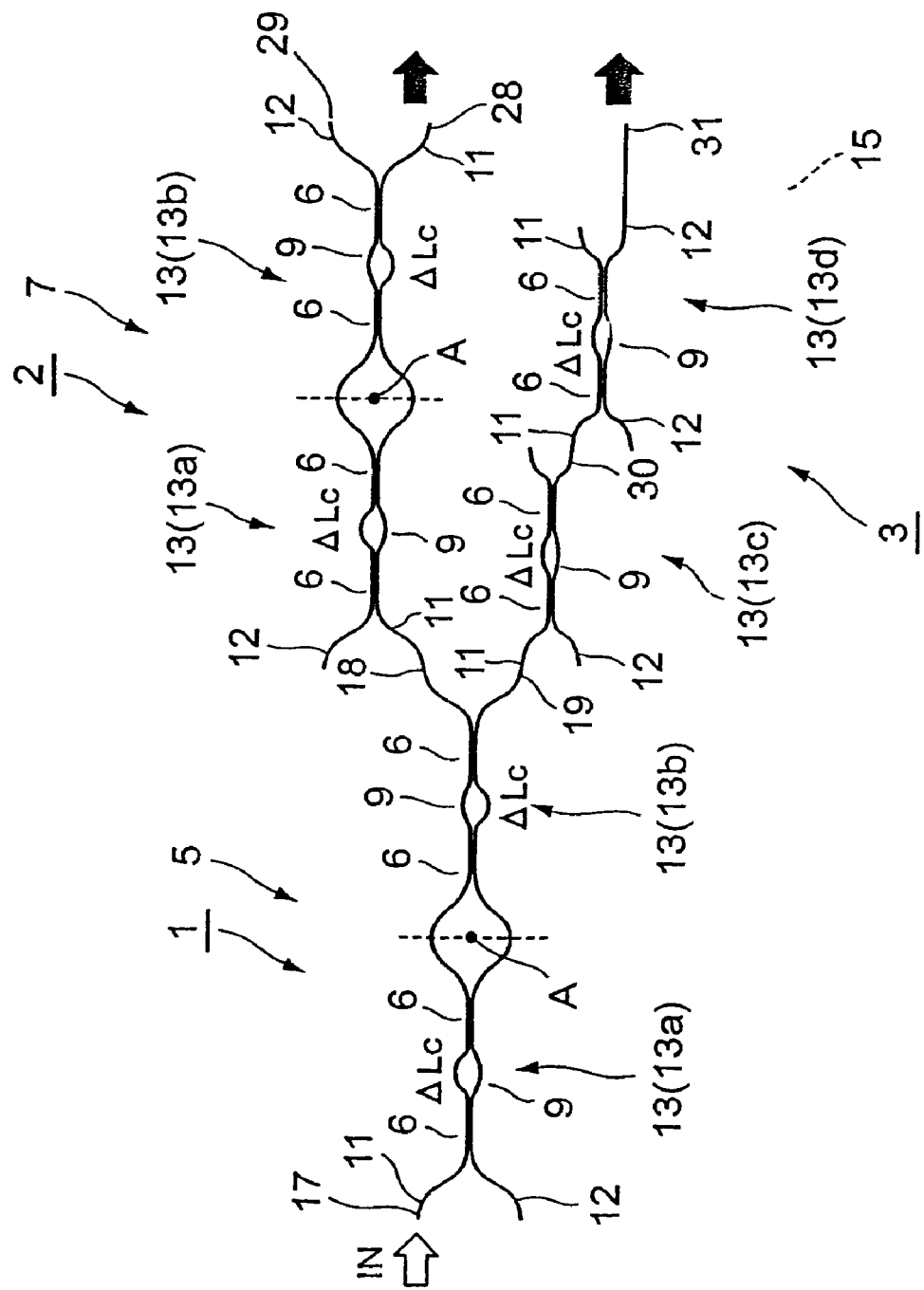
FIG. 1 is an essential constitutional view schematically illustrating a circuit structure of a first embodiment of a broadband wavelength multiplexing and demultiplexing filter according to the present invention.

FIG. 1 shows a first embodiment of the broadband wavelength multiplexing and demultiplexing filter according to the present invention. The broadband wavelength multiplexing and demultiplexing filter of the present embodiment is constructed by forming an optical waveguide circuit shown in the figure on a substrate 15. This circuit has a light input side circuit 1, a first light output side circuit 2, and a second light output side circuit 3.

The light input side circuit 1 has two Mach-Zehnder optical interferometer circuits 13 (13a and 13b) connected in series to each other. Each Mach-Zehnder optical interferometer circuit 13 (13a or 13b) has two directional couplers 6 each composed of the first optical waveguide 11 and the second optical waveguide 12 arranged in parallel to the first optical waveguide 11 with a gap therebetween, and the directional couplers are separated from each other in the lengthwise direction of the optical waveguide.

A connecting circuit between these two Mach-Zehnder optical interferometer circuits 13 (13a and 13b) is a circuit shown in FIG. 2 and is referred to as the first point-symmetrically connected optical interferometer circuit 5 in the present embodiment. In this circuit, the arrangement pitch between the directional couplers 6 of the Mach-Zehnder optical interferometer circuits 13 (13a) is equal to that between the directional couplers 6 of the Mach-Zehnder optical interferometer circuit 13 (13b). In addition, in the Mach-Zehnder optical interferometer circuit 13a, the length of the phase part 9 of the first optical waveguide 11 is lager than that of the second optical waveguide 12 by a set length (in the present embodiment, ΔLc), and in the other Mach-Zehnder optical interferometer circuit 13b, the length of the phase part 9 of the second optical waveguide 12 is larger than that of the first optical waveguide 11 by the set length (in the present embodiment, ΔLc).

Further, the value of the set length ΔLc is properly set in the Mach-Zehnder optical interferometer circuits 13, which will be described below, including the Mach-Zehnder optical interferometer circuits 13a and 13b constituting the first point-symmetrically connected optical interferometer circuit 5.

Furthermore, as shown in FIG. 1, a light input terminal 17 of the first optical waveguide 11 of the light input side circuit 1 is composed of an input port for a plurality of light wavelengths. For the input port (IN port), an output terminal of the first optical waveguide 11 provided with the input port (light input terminal 17) is composed of a through port 18, and an output terminal of the second optical waveguide 12 not provided with the light input port of the light input side circuit 1 is composed of a cross port 19.

The first light output side circuit 2 is connected to the through port 18 of the light input side circuit 1. The first light output side circuit 2 is formed of a second point-symmetrically connected optical interferometer circuit having the same functional structure as the first point-symmetrically connected optical interferometer circuit 5.

Meanwhile, a second light output side circuit 3 is connected to the cross port 19 of the light input side circuit 1. The second light output side circuit 3 includes Mach-Zehnder optical interferometer circuits 13 (13c and 13d) having a different length structure (a total length of the phase part 9 and the two directional couplers 6 is different therefrom), that is, different light transmitting characteristic and wavelength multiplexing and demultiplexing characteristic, from those of the Mach-Zehnder optical interferometer circuits 13 (13a and 13b) respectively constituting the first and second point-symmetrically connected optical interferometer circuits 5 and 7.

These Mach-Zehnder optical interferometer circuits 13c and 13d are connected at n stages (where n is an integral number equal to or greater than 2, and in the present embodiment, n is 2), a light input side of the first optical waveguide 11 of the second-stage Mach-Zehnder optical interferometer circuit 13d is connected to a light output side of the second optical waveguide 12 of the first-stage Mach-Zehnder optical interferometer circuit 13c. In addition, a light input side of the first optical waveguide 11 of the first-stage Mach-Zehnder optical interferometer circuit 13c is connected to the cross port 19 of the light input side circuit 1.

Further, an optical signal output from the cross port 19 among the optical signals having a plurality of wavelength input from the light input terminal 17 of the first optical waveguide 11 of the light input side circuit 1 is input from the first optical waveguide 11 of the first-stage Mach-Zehnder optical interferometer circuit 13c of the second light output side circuit 3 and is then output from a light output side (cross port 31) of the second optical waveguide 12 of the final-stage (in the present embodiment, the second stage) Mach-Zehnder optical interferometer circuit 13d.

Furthermore, the first optical waveguide 11 of the first light output side circuit 2 is connected to the through port 18 of the light input side circuit 1. The optical signal output from the through port 18 among the optical signals having a plurality of wavelengths input from the light input terminal 17 of the first optical waveguide 11 of the light input side circuit 1 is output from its output side (the through port 28) through the first optical waveguide 11 of the first light output side circuit 2.

Therefore, in the wavelength multiplexing and demultiplexing circuit having the Mach-Zehnder optical interferometer circuits 13, light input to the first optical waveguide or the second optical waveguide and then output therefrom is called 'through propagating light', and light input to one optical waveguide and output from the other optical waveguide is called 'cross propagating light'. For example, light input to the light input side of the first optical waveguide 11 and output from the light output side of the first optical waveguide 11 is the through propagating light, and light input to the light input side of the first optical waveguide 11 and output from the light output side of the second optical waveguide 12 is the cross propagating light.

In the first point-symmetrically connected optical interferometer circuit 5, the transmittance $T_{CR}$ of light output from the cross port 19 (that is, cross propagating light) is obtained by the following Expressions (1), (2), and (3):

$$T_{CR}=4C(1-C) \quad (1),$$

$$C=4K(1-K)\cos^2(\Delta\Psi/2) \quad (2), \text{ and}$$

$$\Delta\Psi=(2\pi/\lambda)n_{eff}\cdot\Delta L_C \quad (3)$$

where $\Delta L_C$ is a difference in length between optical paths of the phase parts 9 of the respective Mach-Zehnder optical interferometer circuits 13, K is the coupling efficiency of the directional coupler 6, $n_{eff}$ is an equivalent refractive index of a core (optical waveguide), and λ is a wavelength.

Figure 26:
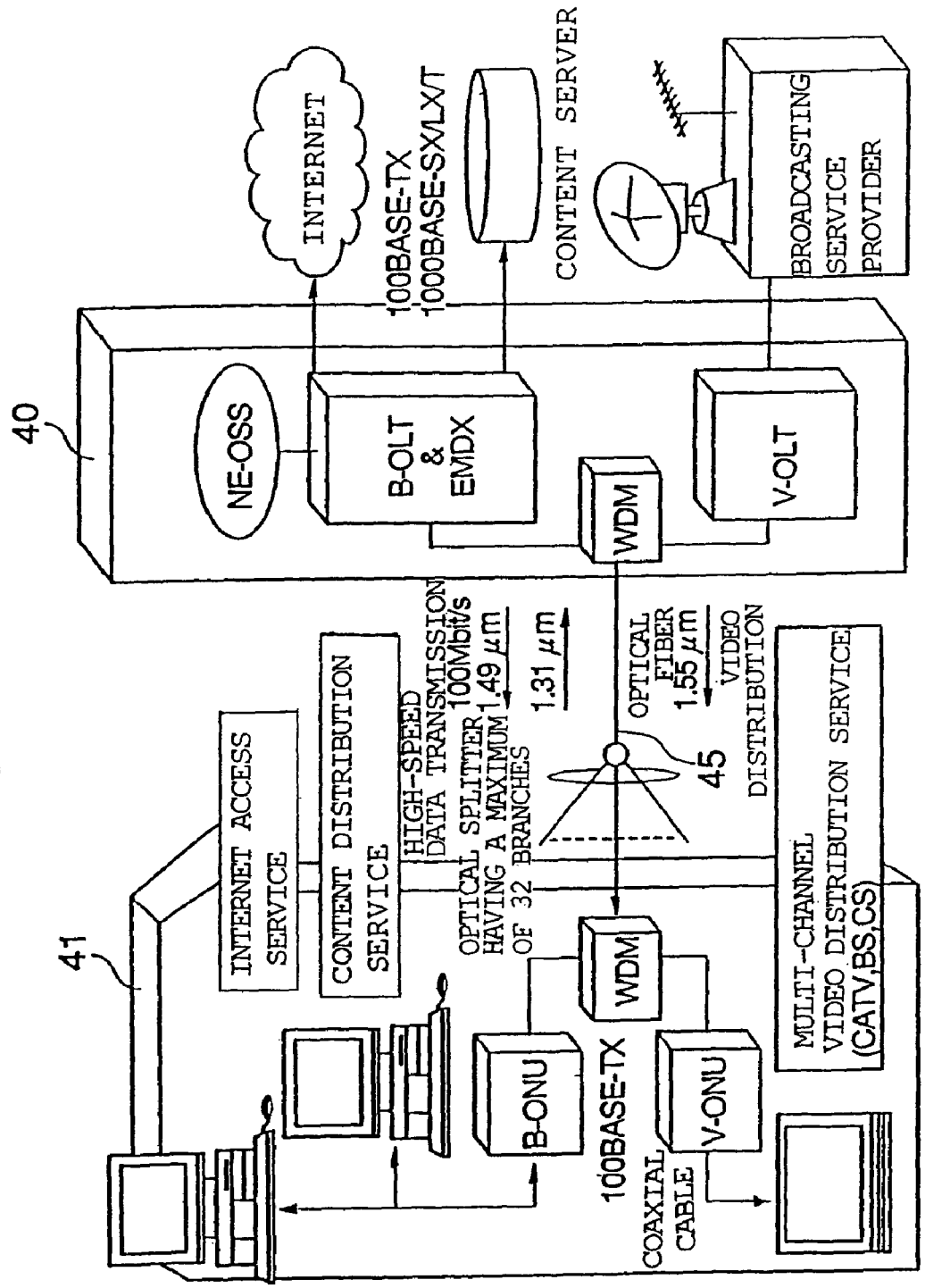
FIG. 26 is an explanatory diagram illustrating the structure of a conventional B-PON system.

For example, when optical signals in the wavelength bands of 1.31 μm, 1.49 μm, and 1.55 μm are input from the light input terminal 17 of the first point-symmetrically connected optical interferometer circuit 5, optical signals in wavelength bands of 1.31 μm and 1.49 μm are output from the through port 18, and an optical signal in a wavelength band of 1.55 μm is output from the cross port 19. In addition, these wavelength bands are currently used in the B-PON system as shown in FIG. 26.

In this case, for the central wavelengths of two of these three wavelengths, when C is zero, $T_{CR}$ is zero. Therefore, the transmittance of the optical signals output from the through port 18 $T_{CR}$ is $1-T_{CR}=1$, and thus two specified wavelengths are output from the through port 18.

Here, for the two wavelengths, since C is zero, the relationship $\cos^2(\Delta\Psi/2)=0$ is established in Expression (2). For example, $\Delta L_C$ is determined to satisfy $\Delta\Psi/2=(2m+3)\pi$ at the wavelength of 1.31 μm and $\Delta\Psi/2=(2m+1)\pi$ at the wavelength of 1.49 μm.

Next, at a wavelength of 1.55 μm, $T_{CR}$ is 1, and the cross port 19 is broadband. Therefore, C is set to about 0.5 for the wavelength of 1.55 μm. The K value of the directional coupler 6 is calculated to satisfy the above-mentioned relationship.

Finally, since the wavelength band of 1.31 μm is the widest transmission band, it is possible to widen a wavelength band by setting the value of K to about zero or 1 (100%) at the wavelength of 1.31 μm, which is the central wavelength thereof.

For example, when manufacturing a quartz-based optical waveguide circuit having a relative index difference Δ of 0.45% and a size of 7.5×7.5 μm, the value of $\Delta L_C$ calculated according to the above-mentioned process is 7.71 μm, and the coupling efficiency K of the directional coupler at the wavelength of 1.31 μm is about zero or 1. In addition, the coupling efficiency K of the directional coupler at the wavelength of 1.55 μm is about 0.77.

Any type of directional coupler 6 will be used if the above-mentioned conditions are satisfied. However, in general, the directional coupler having a short coupling part in length is manufactured with a low error rate. Therefore, it is preferable that the length of the coupling part of the directional coupler 6 shown in FIG. 3 be short.

Figure 4A:
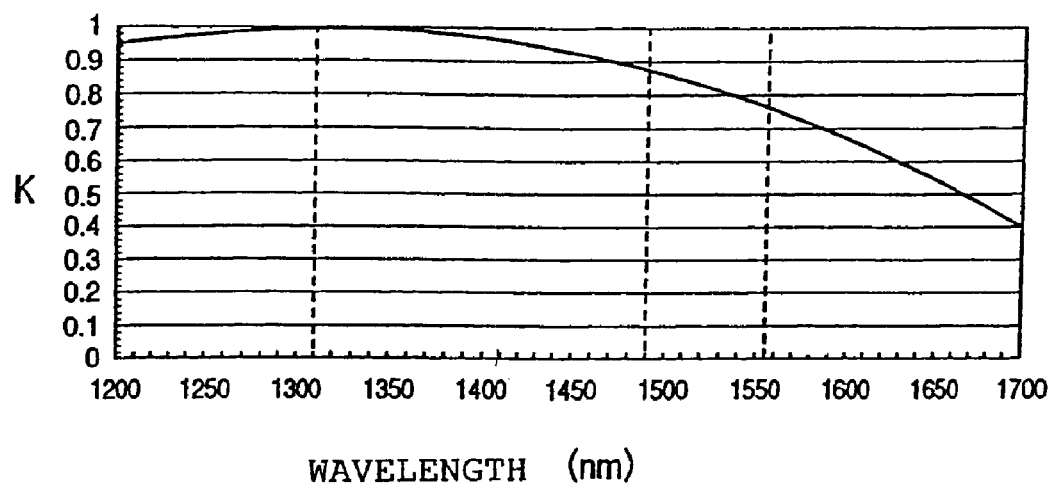
FIG. 4A is a graph showing a result of the characteristic simulation of the point-symmetrically connected optical interferometer circuit (a point-symmetrically connected optical interferometer circuit according to the first embodiment of the present invention) under a condition in which a coupling wavelength of the directional coupler is 924 μm.
Figure 4B:
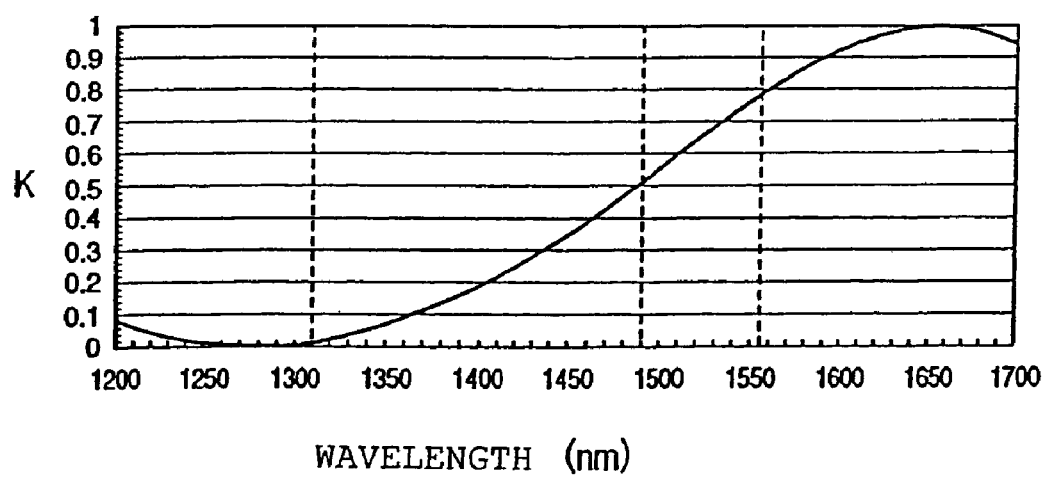
FIG. 4B is a graph showing a result of the characteristic simulation of the point-symmetrically connected optical interferometer circuit (the point-symmetrically connected optical interferometer circuit according to the first embodiment of the present invention) under the condition in which the coupling wavelength of the directional coupler is 2184 μm.

That is, for example, the length of the coupling part of the directional coupler 6 satisfying the above-mentioned conditions is 924 μm or 2184 μm, which is a wavelength characteristic of the coupling efficiency of the directional coupler. As shown in FIGS. 4A and 4B, even when the length of the coupling part of the directional coupler 6 is 924 μm (FIG. 4A) or 2184 μm (FIG. 4B), the above-mentioned conditions are satisfied. In this case, it is preferable that the length of the coupling part of the directional coupler 6 be 924 μm since a decrease in manufacturing errors is expected.

Further, according to the present embodiment, in the first point-symmetrically connected optical interferometer circuit 5, the directional coupler 6 is formed such that the length of the coupling part thereof is 924 μm. In addition, in the wavelength characteristics shown in FIG. 4A, the coupling efficiency K of the directional coupler 6 is set to about 1 at a wavelength of 1.31 μm, and a differential coefficient $dK/d\lambda$ of the coupling efficiency K with respect to a wavelength of 1.55 μm is set to satisfy $dK/d\lambda<0$.

From the above-mentioned viewpoint, the point-symmetrically connected optical interferometer circuit can exhibit a broadband wavelength multiplexing and demultiplexing function. Based on the above-mentioned examination, the first point-symmetrically connected optical interferometer circuit 5 and the second point-symmetrically connected optical interferometer circuit 7 having the same functional structure as the first point-symmetrically connected optical interferometer circuit 5, both being used in the present embodiment, have a pass wavelength band characteristic (light transmission characteristic) for through propagating light represented by a characteristic line a shown in FIG. 5.

Further, as can be seen from the characteristic line a, for example, the loss of the through propagating light is low in a wavelength band of 1.31 μm (1.26 to 1.36 μm) and a wavelength band of 1.49 μm (1.48 to 1.50 μm). That is, the point-symmetrically connected optical interferometer circuits 5 and 7 each have at least one low through loss wavelength band (in other words, through propagating wavelength) where the loss of the through propagating light is low.

Figure 5:
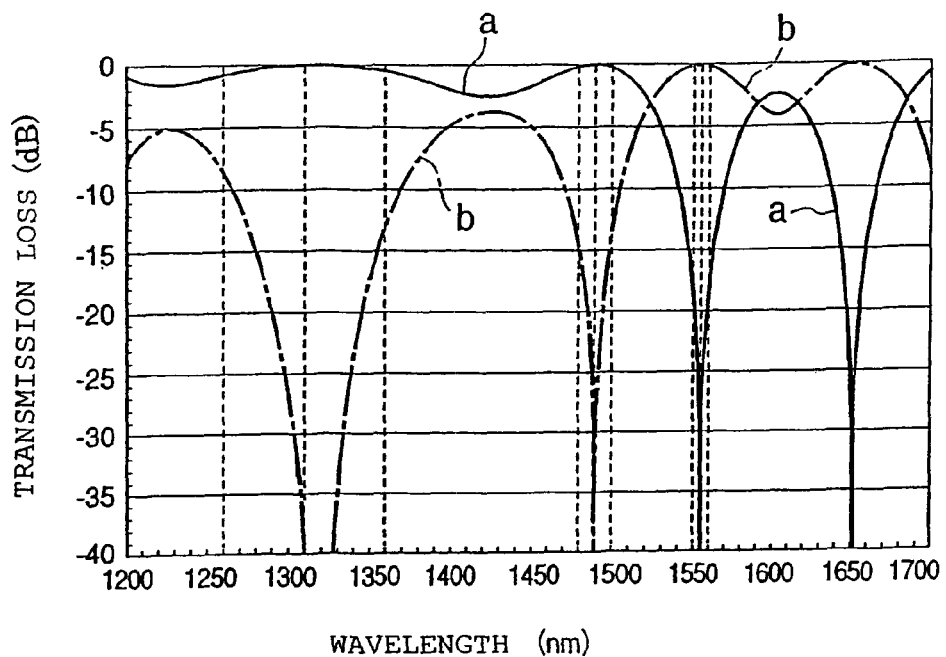
FIG. 5 is a graph showing a transmission characteristic simulation results of optical signals respectively output from a through port and a cross port of the point-symmetrically connected optical interferometer circuit according to the first embodiment of the present invention.

Furthermore, pass wavelength band characteristics (light transmission characteristics) of cross propagating light for the first and second point-symmetrically connected optical interferometer circuits 5 and 7 are represented by a characteristic line b in FIG. 5. The first and second point-symmetrically connected optical interferometer circuits 5 and 7 each include a wavelength band of 1.55 μm (1.55 μm to 1.56 μm) and have at least one low through loss wavelength band (that is, cross propagating wavelength) where the loss of the cross propagating light is low. In addition, these characteristic lines a and b are obtained by simulation.

Therefore, when optical signals in a wavelength band of 1.31 μm, a wavelength band of 1.49 μm, and a wavelength band of 1.55 μm are input to the light input terminal (the light input terminal 17 for optical signals having a plurality of wavelengths) of the first point-symmetrically connected optical interferometer circuit 5 (that is, the light input side circuit 1 in the present embodiment), the optical signals in the wavelength band of 1.31 μm and the wavelength band of 1.49 μm can be output from the through port 18 with low loss. Also, the optical signal in the wavelength band of 1.55 μm can be output from the cross port 19 with low loss.

Moreover, contrary to the above, when the optical signals in the wavelength band of 1.31 μm and the wavelength band of 1.49 μm are input to the through port 18 and the optical signal in the wavelength band of 1.55 μm is input to the cross port 19, the optical signals in these wavelength bands are multiplexed through a course contrary to the above, and are then output from the light input terminal with low loss.

However, as can be seen from the characteristic lines a and b in FIG. 5, in the wavelength band of 1.31 (1.26 to 1.36 μm), the wavelength band of 1.49 μm (1.48 to 1.50 μm), and the wavelength band of 1.55 μm (1.55 to 1.56 μm), isolation is about 15 dB as seen from a band (the overall frequency range of the band), which indicates that isolation is not sufficiently high.

Further, in the present embodiment, the first optical waveguide 11 of the second point-symmetrically connected optical interferometer circuit 7 having the same functional structure as the first point-symmetrically connected optical interferometer circuit 5 is connected to the through port 18 of the first point-symmetrically connected optical interferometer circuit 5 constituting the light input side circuit 1. In this way, the through propagating light output from the through port 18 of the first point-symmetrically connected optical interferometer circuit 5 passes through the first optical waveguide 11 of the second point-symmetrically connected optical interferometer circuit 7 and is then output from a through port 28, which is an output terminal thereof.

Figure 6:
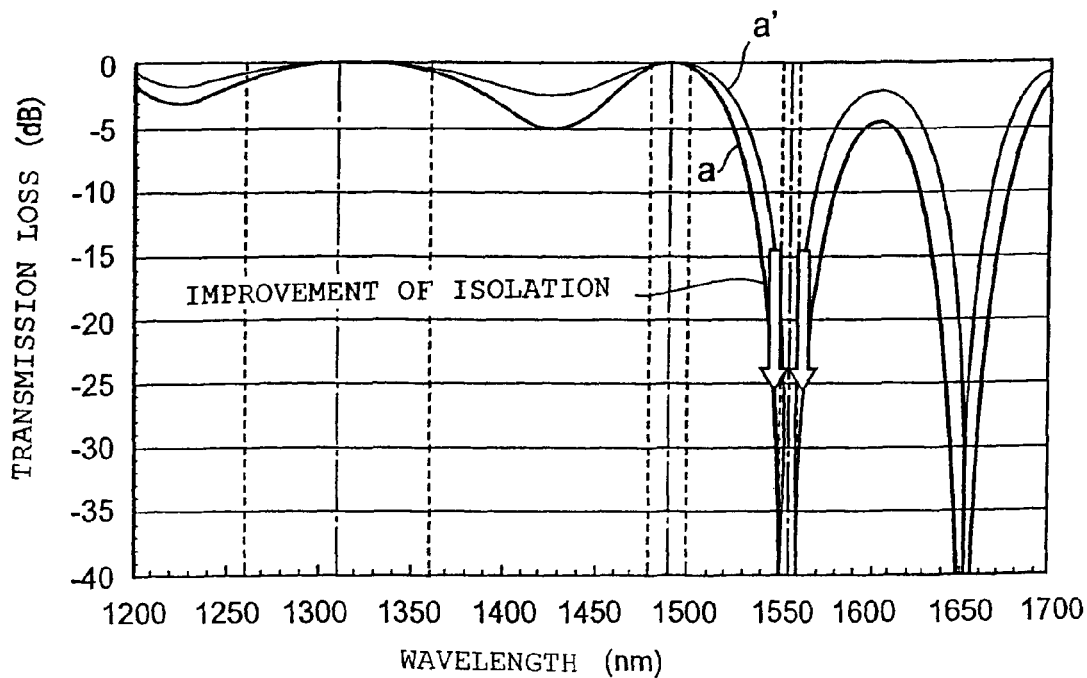
FIG. 6 is a graph showing a transmission characteristic of a through port propagating optical signal of the broadband wavelength multiplexing and demultiplexing filter according to the first embodiment of the present invention, compared to that of a through port propagating optical signal of one point-symmetrically connected optical interferometer circuit.

The characteristic line a in FIG. 6 shows an example of the light transmission characteristics of light (through propagating light of the broadband wavelength multiplexing and demultiplexing filter according to the present embodiment) input to the light input terminal 17 of the light input side circuit 1 and then output from the through port 28 of the first light output side circuit 2. In addition, a characteristic line a' in FIG. 6 shows a light transmission characteristic of the through propagating light of the light input side circuit 1 composed of only the first point-symmetrically connected optical interferometer circuit 5. Further, the respective characteristic lines shown in FIG. 6 are obtained by simulation.

As can be apparently seen from these characteristic lines a and a', the first light output side circuit 2 composed of the second point-symmetrically connected optical interferometer circuit 7 having the same functional structure as the first point-symmetrically connected optical interferometer circuit 5 is connected to the through port 18 of the light input side circuit 1 composed of the first point-symmetrically connected optical interferometer circuit 5, so that it is possible to increase the loss of the through propagating light in a great loss wavelength band (a wavelength band of 1.55 μm) while maintaining the broadband wavelength demultiplexing function.

The wavelength band of 1.55 μm, which is the great loss wavelength band of the through propagating light, is a pass wavelength band of the cross propagating light of the broadband wavelength multiplexing and demultiplexing filter in the present embodiment. That is, the connection structure between the first and second point-symmetrically connected optical interferometer circuits 5 and 7 increases the isolation of the through propagating light with respect to the pass wavelength band of the cross propagating light.

Further, the wavelength band of 1.55 μm, which is the pass wavelength band of the cross propagating light, has a narrow band, but requires a high isolation characteristic in a wide wavelength band. Therefore, in the present embodiment, the Mach-Zehnder optical interferometer circuits 13c and 13d having different length structures from those of the Mach-Zehnder optical interferometer circuits 13a and 13b constituting the first and second point-symmetrically connected optical interferometer circuits 5 and 7 are multistage-connected to form the second light output side circuit (the difference of the length structure causes different multiplexing and demultiplexing characteristic and light transmission characteristic). In addition, the second light output side circuit is connected to the cross port 19 of the first point-symmetrically connected optical interferometer circuit 5 constituting the light input side circuit 1.

At least one of the Mach-Zehnder optical interferometer circuits 13c and 13d (in the present embodiment, both the Mach-Zehnder optical interferometer circuits 13c and 13d) is formed such that the loss of the cross propagating light thereof has a maximum value in at least one of the low through loss wavelength bands of the first point-symmetrically connected optical interferometer circuit 5.

Figure 7:
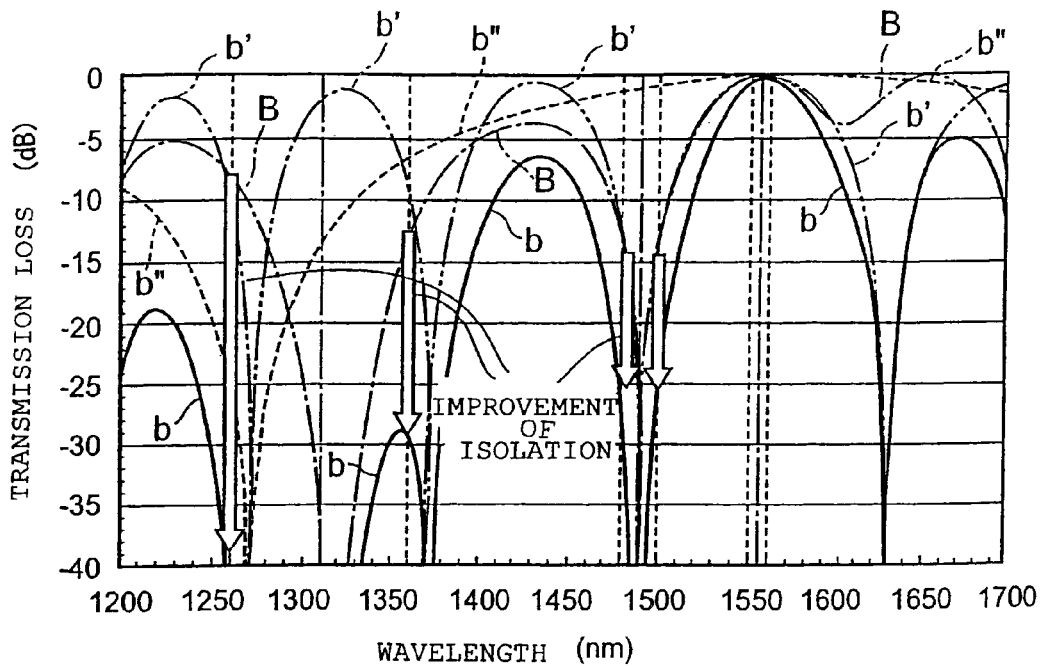
FIG. 7 is a graph showing a transmission characteristic of a cross propagating optical signal of the broadband wavelength multiplexing and demultiplexing filter according to the first embodiment of the present invention, compared to those of cross propagating optical signals of the point-symmetrically connected optical interferometer circuit and a Mach-Zehnder optical interferometer circuit both included in the broadband wavelength multiplexing and demultiplexing filter.

Specifically, the first-stage Mach-Zehnder optical interferometer circuit 13c has the light transmission characteristic of the cross propagating light represented by a characteristic line b' in FIG. 7. That is, the first-stage Mach-Zehnder optical interferometer circuit 13c has the maximum value of loss in a wavelength band of 1.49 µm (1.48 to 1.50 µm), which is the low through loss wavelength band, and in a wavelength band of 1.31 µm (1.26 to 1.36 µm). In addition, the characteristic lines shown in FIG. 7 are obtained by simulation.

Further, the second-stage Mach-Zehnder optical interferometer circuit 13d has the light transmission characteristic of the cross propagating light represented by a characteristic line b" in FIG. 7. That is, the second-stage Mach-Zehnder optical interferometer circuit 13d has the maximum value of loss in a wavelength band of 1.31 µm (1.26 to 1.36 µm), which is one of the low through loss wavelength bands, and a loss value is large in the vicinity of this maximum value.

Furthermore, as indicated by a characteristic line B of FIG. 7, the first point-symmetrically connected optical interferometer circuit 5 has at least one low cross loss wavelength band where the loss of the cross propagating light is low as described above. The vicinity of a wavelength of 1.27 µm where the loss of the cross propagating light of the Mach-Zehnder optical interferometer circuit 13d is maximum is within one of the low through loss wavelength bands of the point-symmetrically connected optical interferometer circuit 5. That is, the Mach-Zehnder optical interferometer circuit 13d is constructed such that the loss of the cross propagating light thereof has the maximum value in at least one of the low through loss wavelength bands of the point-symmetrically connected optical interferometer circuit 5.

The following effects can be obtained by providing these Mach-Zehnder optical interferometer circuits 13c and 13d to form the second light output side circuit 3. That is, the cross propagating light components of the Mach-Zehnder optical interferometer circuits 13c and 13d have the maximum values of loss in a wavelength band of 1.49 µm. Therefore, as represented by the characteristic line b of FIG. 7, in the broadband wavelength multiplexing and demultiplexing filter of the present embodiment, the loss of the cross propagating light exceeds 25 dB in the wavelength band of 1.49 µm. That is, the broadband wavelength multiplexing and demultiplexing filter of the present embodiment can have a high isolation characteristic of the cross propagating light with respect to the through propagating light in the wavelength of 1.49 µm.

Further, since the loss of the cross propagating light of the first point-symmetrically connected optical interferometer circuit 5 is low in a wavelength band of 1.31 µm, it is difficult to increase the isolation of the cross propagating light to the through propagating light in the wavelength band of 1.31 µm with only the first point-symmetrically connected optical interferometer circuit 5. On the other side, the present embodiment makes it possible to increase the isolation of the cross propagating light to the through propagating light in the wavelength band of 1.31 µm by connecting the Mach-Zehnder optical interferometer circuits 13c and 13d to the cross port of the first point-symmetrically connected optical interferometer circuit 5.

In other words, both the cross propagating light components of the Mach-Zehnder optical interferometer circuits 13c and 13d have the maximum values of loss in the wavelength band of 1.31 µm. Particularly, the second-stage Mach-Zehnder optical interferometer circuit 13d has the maximum value of loss around a wavelength of 1.27 µm where the cross loss of the point-symmetrically connected optical interferometer circuit 5 is low. In this way, the loss of the cross propagating light of the broadband wavelength multiplexing and demultiplexing filter according to the present embodiment can exceed 25 dB in the wavelength band of 1.31 µm.

Example 1

According to an example of the first embodiment, the following broadband wavelength multiplexing and demultiplexing filter is manufactured. That is, first, an under clad film made of quartz-based glass and a $TiO_2$-doped core film are formed on a silicon substrate using a flame hydrolysis depositing method. At that time, the relative index difference Δ of the core to the clad is set to 0.4%, and the film thickness of the core is set to 7.5 µm.

Subsequently, an optical circuit pattern is transferred onto the core using a photomask on which a circuit of the broadband wavelength multiplexing and demultiplexing filter shown in FIG. 1 is drawn by a photolithography method and a reactive ion etching method. Then, an over clad film made of quartz-based glass is formed using the flame hydrolysis depositing method again. In this way, the broadband wavelength multiplexing and demultiplexing filter formed by the optical waveguide of the core and having a circuit structure shown in FIG. 1 is manufactured.

Further, the width of the core constituting the optical waveguide is set to 7.5 µm. In the point-symmetrically connected optical interferometer circuits 5 and 7, $\Delta L_C$ of the directional coupler is set to 7.71 µm, the pitch between the directional couplers 6 (as shown in FIG. 3, the distance between the center of the first optical waveguide 11 and the center of the second optical waveguide 12) is set to 11.1 µm, and the length of the coupling part of the directional coupler is set to 924 µm.

Figure 3:
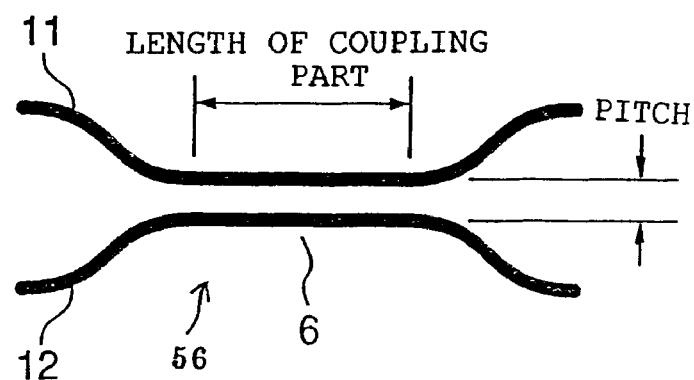
FIG. 3 is an explanatory diagram schematically illustrating the structure of a directional coupler.

Furthermore, in the Mach-Zehnder optical interferometer circuit 13c, $\Delta L_C$ of the directional coupler is set to 11.82 µm, the pitch between the directional couplers 6 (as shown in FIG. 3, the distance between the center of the first optical waveguide 11 and the center of the second optical waveguide 12) is set to 11.1 µm, and the length of the coupling part of the directional coupler is set to 167 µm.

Moreover, in the Mach-Zehnder optical interferometer circuit 13d, $\Delta L_C$ of the directional coupler is set to 2.18 µm, the pitch between the directional couplers 6 (as shown in FIG. 3, the distance between the center of the first optical waveguide 11 and the center of the second optical waveguide 12) is set to 11.1 µm, and the length of the coupling part of the directional coupler is set to 167 µm.

Figure 8:
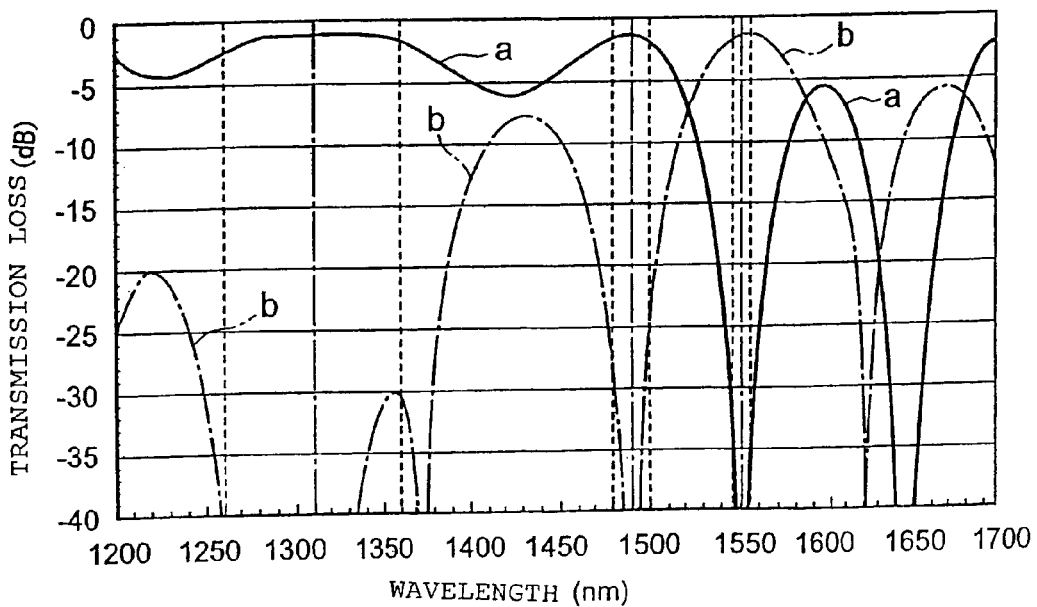
FIG. 8 is a graph showing transmission characteristics of the through propagating optical signal and the cross propagating optical signal of the broadband wavelength multiplexing and demultiplexing filter according to the first embodiment of the present invention.

The characteristics of the broadband wavelength multiplexing and demultiplexing filter according to the example 1 are represented by the characteristic lines a and b in FIG. 8. In addition, the characteristic line a is an actual measurement of the characteristic of the through propagating light, that is, the characteristic of light input to the light input terminal 17 and then output from the through port 28. The characteristic line b is an actual measurement of the characteristic of the cross propagating light, that is, the characteristic of light input to the light input terminal 17 and then output from the cross port 31.

As can be apparently seen from these characteristic lines a and b, an insertion loss is about 2.5 dB in a wavelength of 1.31 µm (1.26 µm to 1.36 µm), and isolation is greater than 27 dB. In addition, the insertion loss is about 1.5 dB in a wavelength of 1.49 µm (1.48 µm to 1.50 µm), and isolation is greater than 25 dB. The insertion loss is about 1.5 dB in a wavelength of 1.55 µm (1.55 µm to 1.56 µm), and isolation is greater than 25 dB.

As can be seen from the results, according to the example 1, characteristics substantially corresponding to design values are obtained, and thus the validity of design is established.

Second Embodiment

Figure 9:
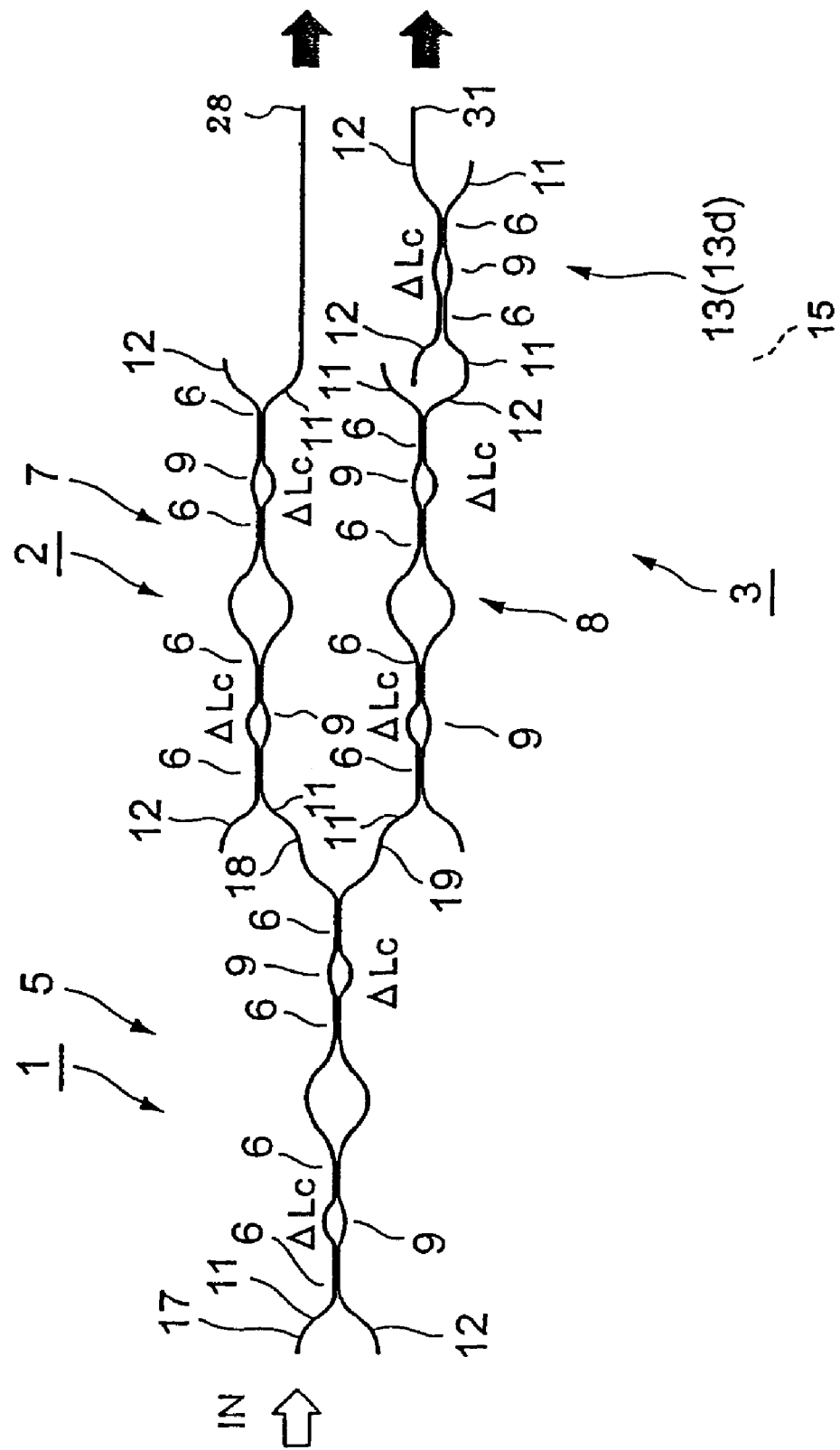
FIG. 9 is a view schematically illustrating a circuit structure of a second embodiment of the broadband wavelength multiplexing and demultiplexing filter according to the present invention.

Next, a second embodiment of the broadband wavelength multiplexing and demultiplexing filter according to the present invention will be described. The second embodiment has the circuit structure shown in FIG. 9, and has substantially the same structure as that in the first embodiment. The second embodiment differs from the first embodiment in that a third point-symmetrically connected optical interferometer circuit 8 having the same functional structure as that of the first point-symmetrically connected optical interferometer circuit 5 is provided instead of the first-stage Mach-Zehnder optical interferometer circuit 13c constituting the second light output side circuit 3.

Further, the Mach-Zehnder optical interferometer circuit 13d is formed such that the loss of the cross propagating light thereof has a maximum value in the wavelength band of 1.31 µm.

Example 2

An example 2 of the second embodiment forms a broadband wavelength multiplexing and demultiplexing filter in the same manner as that in the example 1 of the first embodiment. In the example 2, the relative index difference Δ of a core to a clad is set to 0.3%, and the film thickness of the core is set to 8.0 µm. Then, an optical circuit pattern of the core is formed by transferring the pattern shown in FIG. 9 thereto.

Further, the width of the core constituting the optical waveguide circuit is set to 8.0 µm. In the point-symmetrically connected optical interferometer circuits 5, 7, and 8, $\Delta_{LC}$ of the directional coupler is set to 10.81 µm, the pitch between the directional couplers 6 is set to 11.6 µm, and the length of the coupling part of the directional coupler is set to 810 µm.

Furthermore, in the Mach-Zehnder optical interferometer circuit 13d, $\Delta_{LC}$ of the directional coupler is set to 11.82 µm, the pitch between the directional couplers 6 is set to 12.0 µm, and the length of the coupling part of the directional coupler is set to 30 µm.

Figure 10:
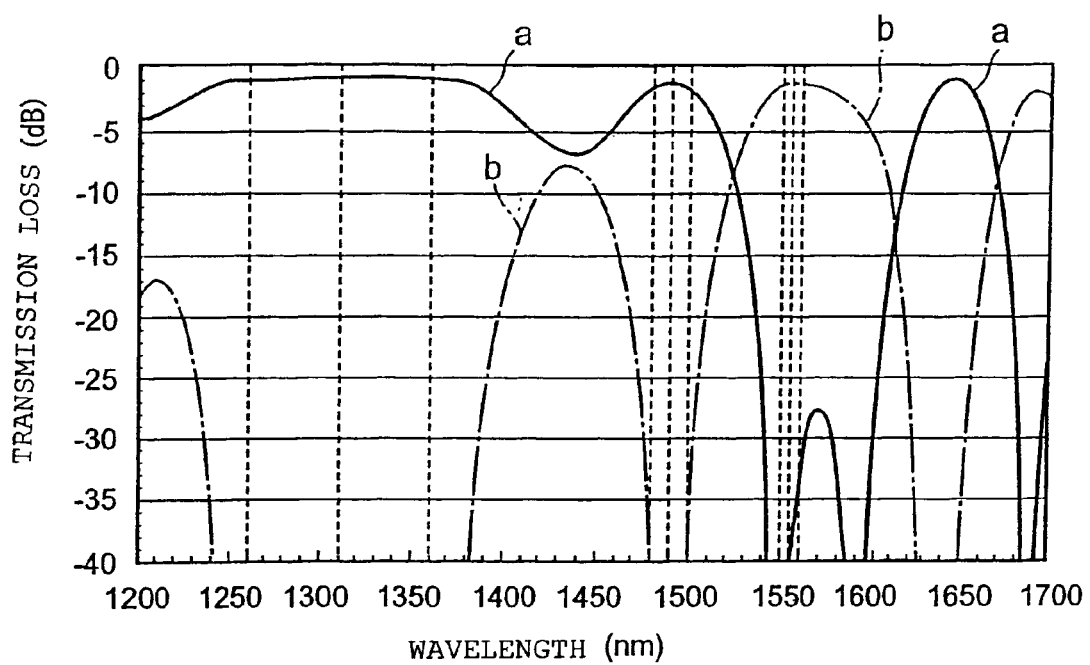
FIG. 10 is a graph showing the transmission characteristics of a through propagating optical signal and a cross propagating optical signal of the broadband wavelength multiplexing and demultiplexing filter according to the second embodiment of the present invention.

The characteristics of the broadband wavelength multiplexing and demultiplexing filter according to the example 2 are represented by characteristic lines a and b in FIG. 10. The characteristic line a is an actual measurement of the characteristic of the through propagating light, that is, the characteristic of light input to the light input terminal 17 and then output from the through port 28. The characteristic line b is an actual measurement of the characteristic of the cross propagating light, that is, the characteristic of light input to the light input terminal 17 and then output from the cross port 31.

As can be apparently seen from these characteristic lines a and b, an insertion loss is about 1.5 dB in a wavelength of 1.31 µm (1.26 µm to 1.36 µm), and isolation is greater than 40 dB. In addition, the insertion loss is about 1.5 dB in a wavelength of 1.49 µm (1.48 µm to 1.50 µm), and isolation is greater than 30 dB. The insertion loss is about 1.5 dB in a wavelength of 1.55 µm (1.55 µm to 1.56 µm), and isolation is greater than 30 dB. Therefore, the example 2 also has characteristics corresponding to design values, and thus the validity of design is established.

As described above, according to the first and second embodiments, the optical waveguide circuit formed on a substrate has the first point-symmetrically connected optical interferometer circuit 5 formed by accurately point-symmetrically connecting two equal Mach-Zehnder optical interferometer circuits 13a and 13b in series. The point-symmetrically connected optical interferometer circuit 5 has a characteristic of multiplexing and demultiplexing a broadband wavelength.

A light input side circuit 1 is formed by connecting one or more point-symmetrically connected optical interferometer circuits 5 in series, and the light input terminal 17 of the first optical waveguide 11 of the light input side circuit 1 is composed of an input port for the optical signals having a plurality of wavelengths. Therefore, the optical signals having a plurality of broadband wavelengths are reliably demultiplexed by the light input side circuit 1 and then are respectively output from the output side of the first optical waveguide 11 and the output side of the second optical waveguide 12 constituting the light input side circuit 1.

The present inventors have proved the fact by examination, such as simulation, that, when a plurality of point-symmetrically connected optical interferometer circuit are connected to each other in series, the isolation characteristic of the pass wavelength band (transmission wavelength band) of through propagating light (light input to the first optical waveguide 11 or the second optical waveguide 12 and then output therefrom) with respect to the pass wavelength band (transmission wavelength band) of cross propagating light (light input to the first optical waveguide 11 and the second optical waveguide 12 and then output from the other waveguide) is improved.

Further, the output terminal of the first optical waveguide 11 of the light input side circuit 1 is composed of a through port, and the through port is connected to the first light output side circuit 2 formed by connecting in series one or more point-symmetrically connected optical interferometer circuits 7 having the same functional structure as that of the point-symmetrically connected optical interferometer circuit 5. In this way, it is possible to increase the isolation of the through propagating light with respect to the pass wavelength band of the cross propagating light while maintaining the broadband wavelength demultiplexing characteristic.

Furthermore, according to the second embodiment, the output terminal of the second optical waveguide 12 of the light input side circuit 1 is composed of a cross port, and the cross port is connected to the second light output side circuit 3 including one or more Mach-Zehnder optical interferometer circuits 13c and 13d having a different length structure from the Mach-Zehnder optical interferometer circuits 13a and 13b constituting the point-symmetrically connected optical interferometer circuit 5. In this way, the characteristics caused by the structures of the Mach-Zehnder optical interferometer circuits 13c and 13d constituting the second light output side circuit 3 make it possible to increase the isolation of cross propagating light to the pass wavelength band of through propagating light.

Moreover, all the light input side circuit 1 and the first and second light output side circuits 2 and 3 can multiplex broadband wavelengths, contrary to the demultiplexing, by changing the input direction of light in the reverse direction.

Further, according to the present embodiment, it is possible to multiplex and demultiplex optical signals having broadband wavelengths with low loss, and thus it is possible to realize a broadband wavelength multiplexing and demultiplexing filter having an excellent high-isolation characteristic. Therefore, it is possible to manufacture a system at low costs, capable of simultaneously providing multi-channel image signals with one optical fiber.

Furthermore, according to the first embodiment of the present invention, the second light output side circuit 3 has n-stage (where n is a integral number equal to or greater than 2) Mach-Zehnder optical interferometer circuits 13c and 13d. As such, it is possible to reliably form a broadband wavelength multiplexing and demultiplexing filter having the above effects by connecting the n-stage circuits to each other to form the second light output side circuit 3.

Moreover, as a method for connecting the n-stage Mach-Zehnder optical interferometer circuits 13c and 13d, a connecting method is adopted in which cross propagating light travels from the first optical waveguide 11 to the second optical waveguide 12 located at the next stage thereof. In this way, light output from the cross port of the light input side circuit 1 is input to the first optical waveguide 11, which is the first stage circuit of the second light output side circuit 3, and is then output from the light output side of the second optical waveguide 12, which is the last stage circuit. Therefore, it is possible to repeatedly perform an operation one or more times in which light is input from the first optical waveguide 11 of the Mach-Zehnder optical interferometer circuit and is then output to the second optical waveguide 12 (cross propagation) in the course of the propagation of light through the second light output side circuit 3.

Further, it is possible to more reliably increase the isolation of the cross propagating light with respect to the through propagating light of the light input side circuit by setting the pass wavelength band characteristic of the cross propagating light by the structures of the Mach-Zehnder optical interferometer circuits 13c and 13d constituting the second light output side circuit 3.

Furthermore, in the present embodiment, the point-symmetrically connected optical interferometer circuit 5 has one or more low through loss wavelength bands where the loss of through propagating light is low. In addition, the Mach-Zehnder optical interferometer circuits 13c and 13d (the Mach-Zehnder optical interferometer circuit 13d in the second embodiment) constituting the second light output side circuit 3 has a maximum value of cross propagating light loss in at least one of the plurality of low through loss wavelength bands. According to this configuration, it is possible to increase the loss of the cross propagating light in the low through loss wavelength band by the structures of the Mach-Zehnder optical interferometer circuits 13c and 13d (the Mach-Zehnder optical interferometer circuit 13d in the second embodiment) constituting the second light output side circuit 3. Therefore, it is possible to more reliably increase the isolation characteristic of cross propagating light with respect to the pass wavelength band of through propagating light of the broadband wavelength multiplexing and demultiplexing filter.

Moreover, in the present embodiment, the point-symmetrically connected optical interferometer circuit 5 has one or more low cross loss wavelength bands where the loss of cross propagating light is low. In addition, at least one of the Mach-Zehnder optical interferometer circuits 13c and 13d (the Mach-Zehnder optical interferometer circuit 13d in the second embodiment) constituting the second light output side circuit 3 has a maximum value of cross propagating light loss in at least one of the one or more low through loss wavelength bands. According to this configuration, it is possible to increase the loss of the point-symmetrically connected optical interferometer circuit 5 in the low through loss wavelength band by the Mach-Zehnder optical interferometer circuits 13c and 13d (the Mach-Zehnder optical interferometer circuit 13d in the second embodiment). Therefore, it is possible to more reliably increase the isolation characteristic of cross propagating light with respect to the pass wavelength band of through propagating light of the broadband wavelength multiplexing and demultiplexing filter.

Third Embodiment

Next, a third embodiment of a broadband wavelength multiplexing and demultiplexing filter according to the present invention will be described. A broadband wavelength multiplexing and demultiplexing filter 50 of the third embodiment is constructed by forming the optical waveguide circuit shown in FIG. 11 on a substrate 15, and this circuit is constructed by accurately point-symmetrically connecting phase-part-intervention-type point-symmetrically connected optical interferometer circuits 52a and 52b in series.

In each of the phase-part-intervention-type point-symmetrically connected optical interferometer circuits 52a and 52b, optical couplers 53a and 53b are accurately point-symmetrically formed and have the same structure, and a phase portion 54 is positioned between the optical couplers 53a and 53b. In addition, the optical couplers 53a and 53b each comprises a directional coupler 56 (see FIG. 3) and a second phase part 58 having $\Delta L_0$. Further, the length (phase amount) $\Delta L_0$ of the second phase part 58 is different from the length (phase amount) of a phase part 54.

In the phase-part-intervention-type point-symmetrically connected optical interferometer circuits 52a and 52b shown in FIG. 11, the arrangement pitches between the directional couplers 56 are equal to each other. In the phase part 54 of the phase-part-intervention-type point-symmetrically connected optical interferometer circuit 52a (which is located at the left side of FIG. 11), the length of the first optical waveguide 11 is longer than that of the second optical waveguide 12 by a set length (in the present phase-part-intervention-type point-symmetrically connected optical interferometer circuit 52b (which is located at the right side of FIG. 11), the length of the second optical waveguide 12 is longer than that of the first optical waveguide 11 by the set length (in the present embodiment, $\Delta L_1$).

Optical couplers 53a and 53b constituting the phase-part-intervention-type point-symmetrically connected optical interferometer circuits 52a and 52b each have two second phase parts 58 respectively formed in the first optical waveguide 11 and the second optical waveguide 12. Therefore, in each of the phase-part-intervention-type point-symmetrically connected optical interferometer circuits 52a and 52b, the difference between the length of the first optical waveguide 11 and the length of the second optical waveguide 12 becomes the set length ($\Delta L_1$) since the set lengths $\Delta L_0$ of the second phase parts 58 are canceled.

The above-mentioned set lengths $\Delta L_0$ and $\Delta L_1$ are properly set according to the circuit design of the respective phase-part-intervention-type point-symmetrically connected optical interferometer circuits 52a and 52b.

As shown in FIG. 11, the light input terminal 17 of the first optical waveguide 11 is composed of an input port for optical signals having a plurality of wavelengths. An output terminal of the first optical waveguide 11 corresponding to the input port (an IN port) is composed of the through port 18, and an output terminal of the second optical waveguide 12 not provided with an input port is composed of the cross port 19.

In the phase-part-intervention-type point-symmetrically connected optical interferometer circuits 52a and 52b, the transmittance $T_{CR}$ of light (that is, cross propagating optical signal) output from the cross port 19 is calculated by the following Expressions (1), (2), (3'), (4), and (5):

$$T_{CR}=4C(1-C) \quad (1),$$

$$C=4K(1-K)\cos^2(\Delta\Psi/2) \quad (2),$$

$$\Delta\Psi=n_{eff}\cdot\Delta L_1(2\pi/\lambda) \quad (3')$$

$$K=4P(1-P)\cos^2(\Delta\Phi/2) \quad (4), \text{ and}$$

$$\Delta\Phi=n_{eff}\cdot\Delta L_0(2\pi/\lambda) \quad (5)$$

where P is the coupling efficiency of the directional coupler 56, $\Delta L_0$ is a difference in length between the optical paths of optical couplers, $\Delta L_1$ is a difference in length between the optical paths of phase-part-intervention-type point-symmetrically connected optical interferometer circuits, $n_{eff}$ is an equivalent refractive index of a core (optical waveguide), and $\lambda$ is a wavelength.

Example 3

As an example 3 of the third embodiment, the broadband wavelength multiplexing and demultiplexing filter 50 is designed as follows. A circuit design using Expressions (1) to (5) will be described below. Further, in the circuit design, optical signals in the wavelength bands of 1.31 μm, 1.49 μm, and 1.55 μm are output from the through port 18, and an optical signal having a wavelength band of 1.65 μm is output from the cross port 19.

For two wavelength bands of 1.31 μm and 1.55 μm having the greatest wavelength difference therebetween, since C is almost zero and $T_{CR}$ is almost zero, the transmittance of light propagated to the through port 18 is about 1 from the relationship $1-T_{CR}\cong1$. Therefore, the two specified wavelengths are output from the through port 18. Since C is almost zero, $\cos^2(\Delta\Psi/2)$ is almost zero in Expression (2). That is, $\Delta L_1$ is determined that the relationship $\Delta\Psi T/2\cong(2m+3)\pi$ is satisfied in the wavelength band of 1.31 μm, and that the relationship $\Delta\Psi/2\cong(2m+1)\pi$ is satisfied in the wavelength band of 1.55 μm.

Next, when $T_{CR}$ is almost one in the wavelength band of 1.65 μm, C is about 0.5. The coupling efficiency K of the optical coupler is determined by calculation so as to satisfy the above condition.

Subsequently, in order to widen the wavelength band of 1.31 μm, the wavelength band of 1.49 μm, and the wavelength band of 1.55 μm, it is necessary to extend a wavelength band where C is almost zero in the vicinities of these wavelength bands as widely as possible. That is, a wavelength band where K is almost zero is extended as widely as possible. In addition, at the same time, in a wavelength band of 1.65 μm, the coupling efficiency P of the directional coupler and $\Delta L_0$ are calculated so as to obtain the above-mentioned value of K.

Figure 12A:
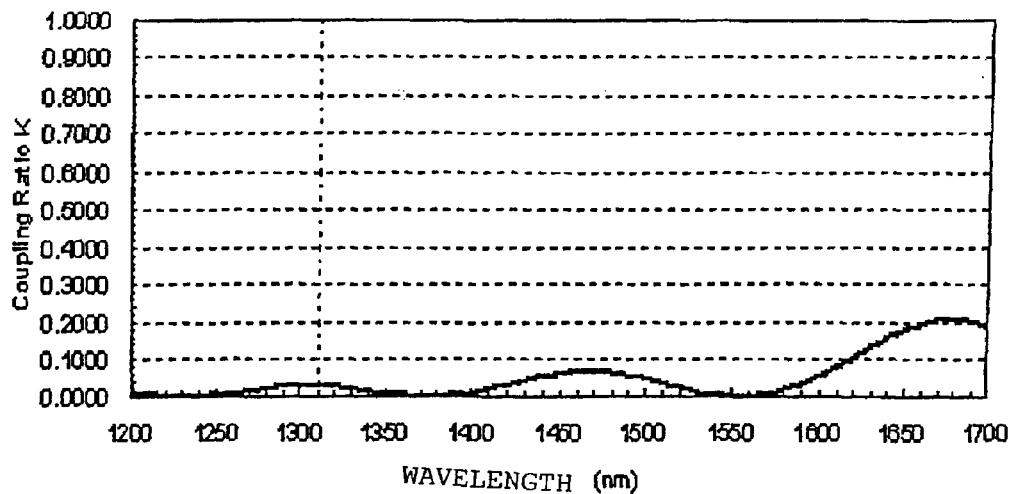
FIG. 12A is a graph showing an optical coupling characteristic of the broadband wavelength multiplexing and demultiplexing filter shown in FIG. 11.

In this way, the directional coupling efficiency P, the set length $\Delta L_0$ of the second phase part 58, and the set length $\Delta L_1$ of the phase part 54 are calculated, and the broadband wavelength multiplexing and demultiplexing filter 50 is manufactured in a state in which the relative index difference Δ of the core with respect to the clad is 0.8%. Then, an optical coupling characteristic and a filter characteristic (a wavelength characteristic of transmittance) of the filter are shown in FIGS. 12A and 12B.

Figure 12B:
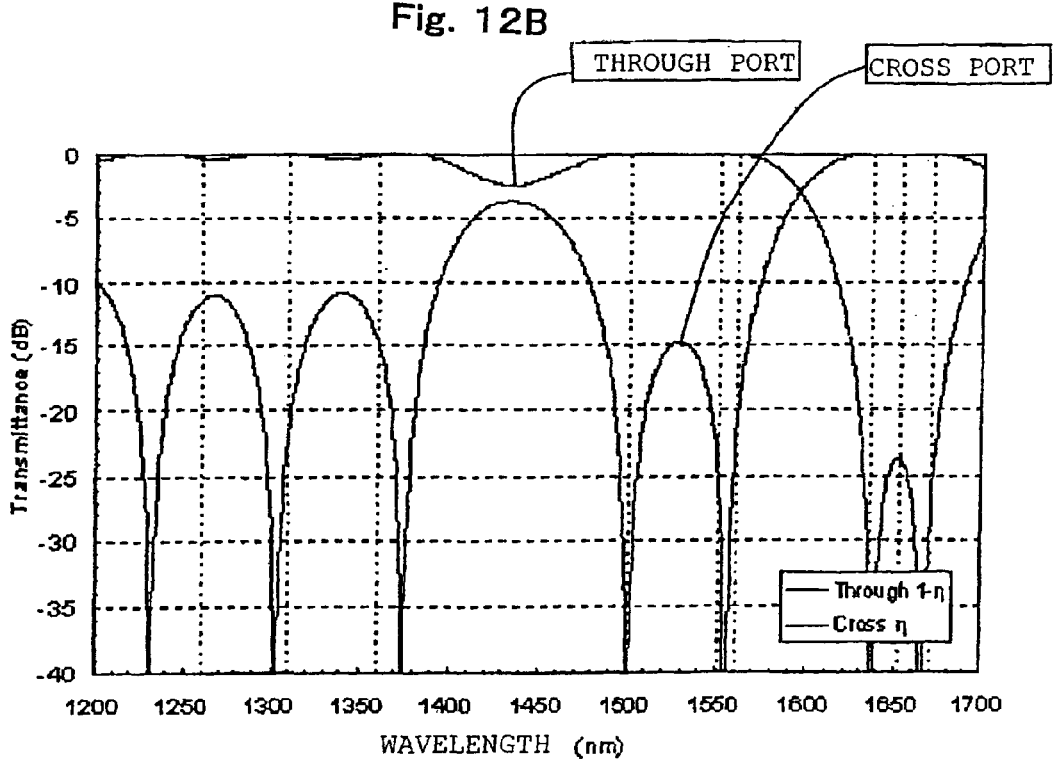
FIG. 12B is a graph showing a wavelength characteristic of the transmittance of the broadband wavelength multiplexing and demultiplexing filter shown in FIG. 11.

As can be seen from FIG. 12B, the broadband wavelength multiplexing and demultiplexing filter 50 can output optical signals in the wavelength bands of 1.31 μm, 1.49 μm, and 1.55 μm from the through port 18 and output an optical signal in the wavelength band of 1.65 μm from the cross port 19.

Fourth Embodiment

Next, a fourth embodiment of the broadband wavelength multiplexing and demultiplexing filter according to the present invention will be described. The fourth embodiment has a circuit structure shown in FIG. 13 and is different from the third embodiment in that an additional broadband wavelength multiplexing and demultiplexing filter is connected in series to the through port 18 of the circuit shown in FIG. 11, and in that an additional broadband wavelength multiplexing and demultiplexing filter and two (a two-stage structure) filter circuits are connected in series to the cross port of the circuit shown in FIG. 11. The fourth embodiment will be described below in detail with reference to FIG. 13.

Figure 13:
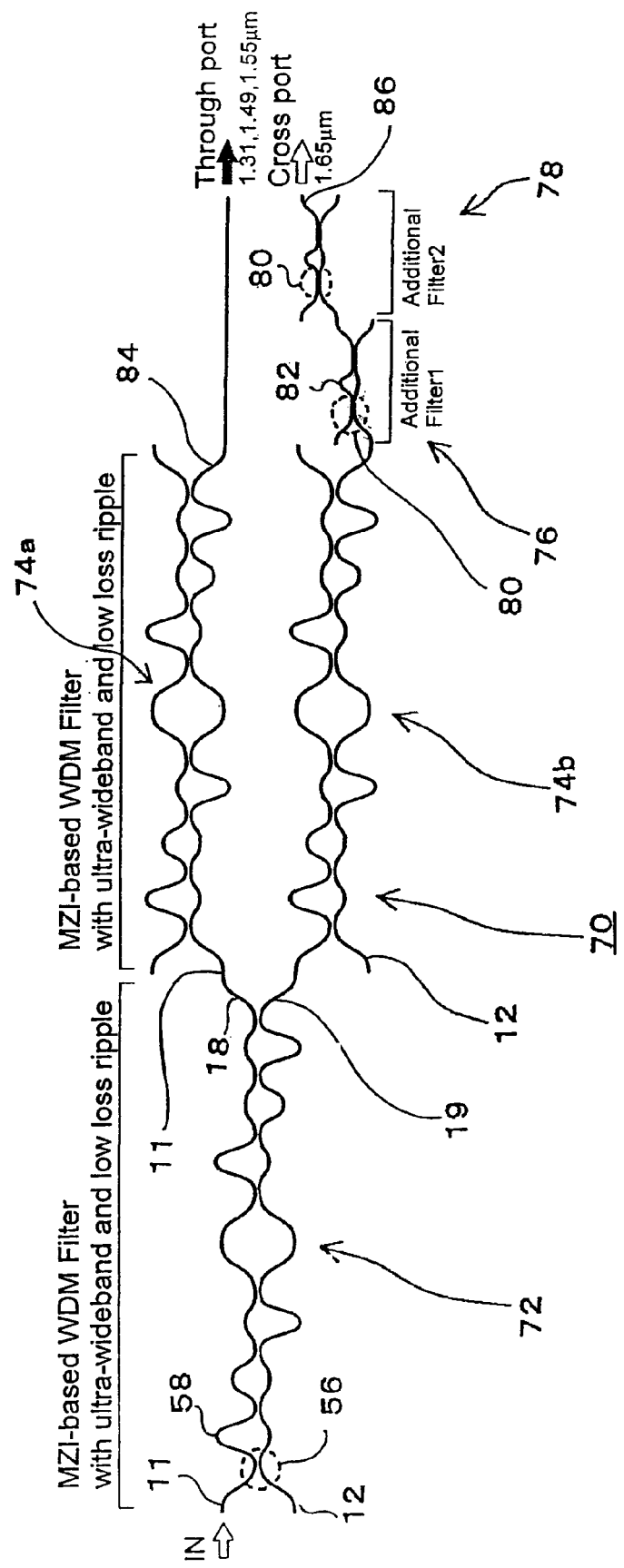
FIG. 13 is a view schematically illustrating a circuit structure of a fourth embodiment of the broadband wavelength multiplexing and demultiplexing filter of the present invention.

A broadband wavelength multiplexing and demultiplexing filter 70 shown in FIG. 13 comprises a first-stage broadband wavelength multiplexing and demultiplexing filter 72, second-stage broadband wavelength multiplexing and demultiplexing filters 74a and 74b respectively connected in series to the through port 18 (a port shown on the upper side of FIG. 13) and the cross port 19 (a port shown on the lower side of FIG. 13) of the first-stage broadband wavelength multiplexing and demultiplexing filter 72, and filter circuits 76 and 78 having a two-stage structure that are connected in series to a cross port of the second-stage broadband wavelength multiplexing and demultiplexing filter 74b. In addition, the second-stage broadband wavelength multiplexing and demultiplexing filters 74a and 74b have the same structure as the first-stage broadband wavelength multiplexing and demultiplexing filter 72. Since the first-stage broadband wavelength multiplexing and demultiplexing filter 72 has already been described in detail in the example 3, a description thereof will be omitted.

The filter circuits 76 and 78 are connected in series to a second directional coupler 80 and a third phase part 82, respectively. In addition, the second directional coupler 80 is different from the directional coupler 56 (see FIG. 11) in the first-stage or second-stage broadband wavelength multiplexing and demultiplexing filter 72, 74a, or 74b in coupling efficiency. Further, the third phase part 82 is different from the second phase part 58 (see FIG. 11. $\Delta L_0$ in FIG. 11) in the first-stage or second-stage broadband wavelength multiplexing and demultiplexing filter 72, 74a, or 74b in length (phase amount).

In the broadband wavelength multiplexing and demultiplexing filter 70, optical signals input to the input port and then output from a through port 84 (the lower port of the second-stage broadband wavelength multiplexing and demultiplexing filter 74a in FIG. 13) pass through only the optical waveguide located at the through port side of the first-stage and second-stage broadband wavelength multiplexing and demultiplexing filters 72 and 74a.

Further, optical signals input to the input port and then output from a cross port 86 (the upper port of the second-stage broadband wavelength multiplexing and demultiplexing filter circuit 78 in FIG. 13) pass through only the optical waveguide located at the cross port side of the first-stage and second-stage broadband wavelength multiplexing and demultiplexing filters 72 and 74b, and the first-stage and second-stage filter circuits 76 and 78.

Example 4

Figure 14:
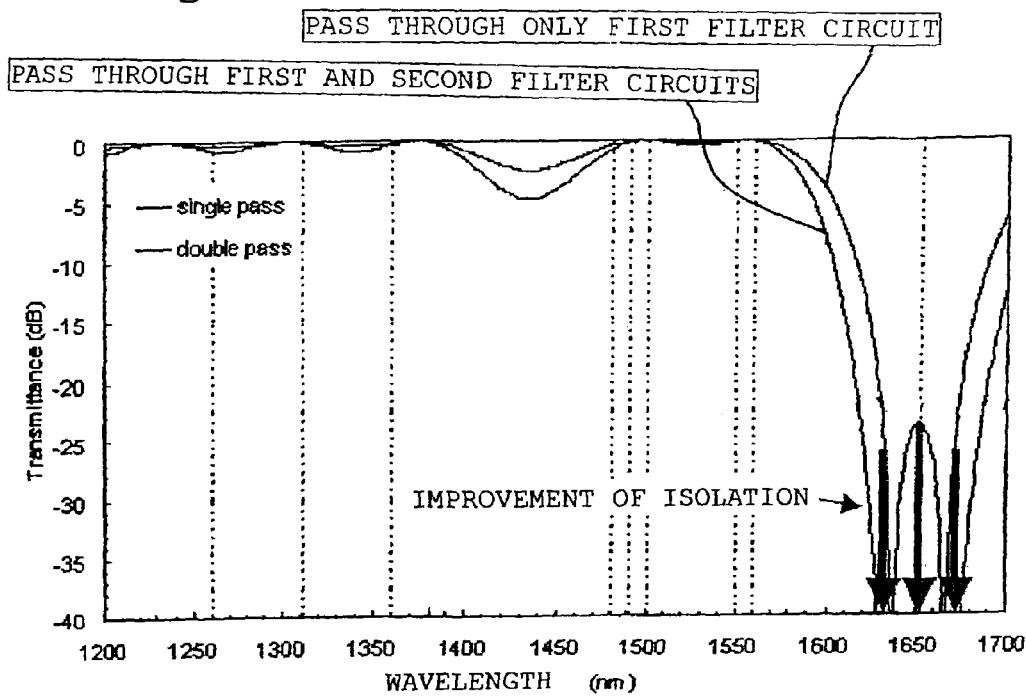
FIG. 14 is a graph showing a wavelength characteristic of the transmittance of light output from a through port of the wavelength multiplexing and demultiplexing filter shown in FIG. 13.
Figure 15:
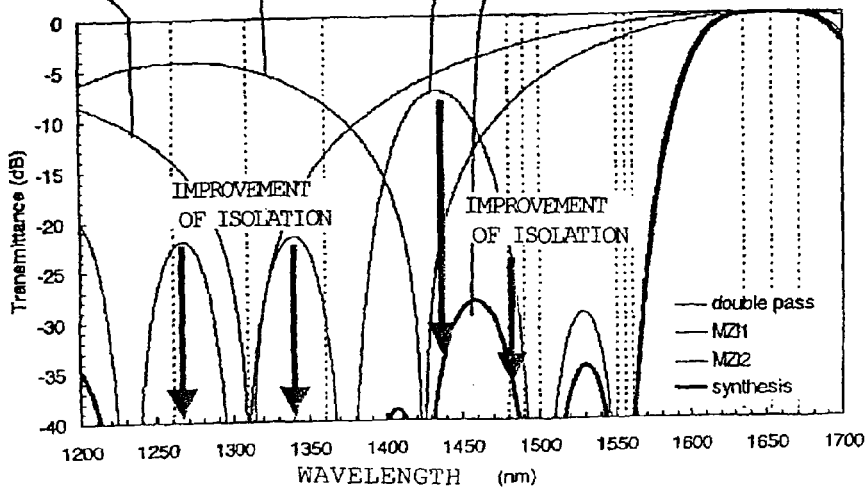
FIG. 15 is a graph showing a wavelength characteristic of the transmittance of light output from a cross port of the wavelength multiplexing and demultiplexing filter shown in FIG. 13.
Figure 16:
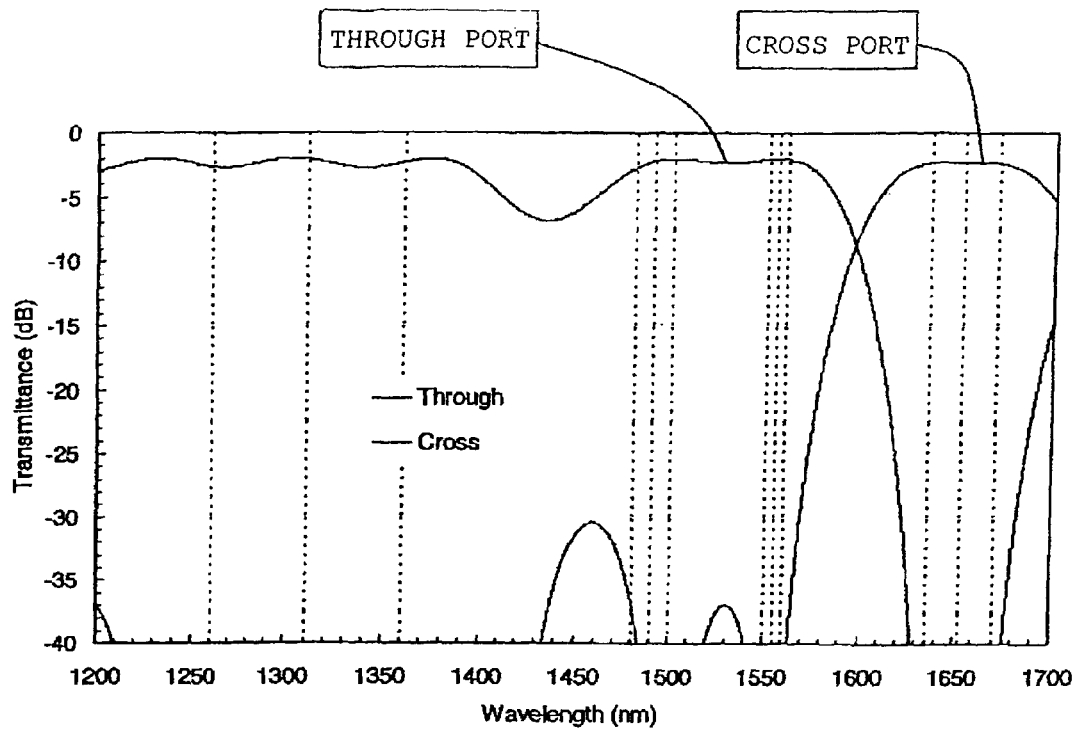
FIG. 16 is a graph showing a wavelength characteristic of the transmittance of the broadband wavelength multiplexing and demultiplexing filter shown in FIG. 13.

According to an example 4 of the fourth embodiment, the broadband wavelength multiplexing and demultiplexing filter 70 shown in FIG. 13 is manufactured. FIG. 14 is a graph showing the design of wavelength characteristics of transmittance when optical signals pass through the first-stage and second-stage broadband wavelength multiplexing and demultiplexing filters 72 and 74a located at the through port, and FIG. 15 is a graph showing the design of the wavelength characteristic of transmittance when optical signals pass through the first-stage and second-stage broadband wavelength multiplexing and demultiplexing filters 72 and 74b and the first-stage and second-stage filter circuits 76 and 78 located at the cross port. FIG. 16 is a graph showing the examination result of the wavelength characteristic (light transmission characteristic) of transmittance of the broadband wavelength multiplexing and demultiplexing filter 70 formed on the basis of FIGS. 14 and 15.

In FIG. 15, the wavelength characteristic of the transmittance of an optical signal output from the cross port 86 of the second-stage broadband wavelength multiplexing and demultiplexing filter 74b has a valley-shaped (transmittance is lowered, and thus a large loss occurs) spectrum in a wavelength band of 1.31 μm. However, it is understood that isolation in the wavelength band of 1.31 μm can be improved larger than 40 dB by forming the (first-stage) filter circuit 76 having the wavelength characteristic of the transmittance of an optical signal in which a spectrum in the wavelength band of 1.31 μm is a valley shape and bypassing the optical signal therethrough.

In FIG. 15, the wavelength characteristic of the transmittance of an optical signal output from the cross port of the second-stage broadband wavelength multiplexing filter 74b becomes a mountain-shaped (a portion where the transmittance increases and a loss is low) spectrum in a wavelength band of 1.43 μm in order to improve isolation in the wavelength bands of around 1.49 μm, 1.55 μm and 1.43 μm. However, it is understood that isolation in the wavelength band of 1.43 μm can be improved larger than 30 dB by forming the (second-stage) filter circuit 78 having the wavelength characteristic of the transmittance of an optical signal in which a spectrum in the wavelength band of 1.43 μm is a valley shape and by passing the optical signal therethrough.

As such, in the example 4, when the wavelength characteristic of the transmittance of the optical signal output from the cross port of the second-stage broadband wavelength multiplexing and demultiplexing filter 74b has a valley-shaped spectrum or a mountain-shaped spectrum, it is possible to construct the broadband wavelength multiplexing and demultiplexing filter 70 having a broad band and high isolation by making a wavelength band having a peak value of each mountain-shaped spectrum or a wavelength band having a peak value of each valley-shaped spectrum equal to a wavelength band having a peak value of the valley-shaped spectrum of the wavelength characteristic of the transmittance of the first-stage and second-stage filter circuits 76 and 78 arranged at the latter stage.

The broadband wavelength multiplexing and demultiplexing filter 70 having a circuit structure shown in FIG. 13 is formed in consideration of FIGS. 14 and 15. The examination result thereof is shown in FIG. 16. In the broadband wavelength multiplexing and demultiplexing filter 70, first, an under clad film and a core film made of quartz-based glass obtained by doping $GeO_2$ are formed on a silicon substrate using a flame hydrolysis depositing method. At that time, the relative index difference Δ is set to 0.8%, and the film thickness of the core is set to 6.5 μm. Subsequently, an optical circuit pattern is transferred to the core using a photo mask on which a circuit of the broadband wavelength multiplexing and demultiplexing filter 70 shown in FIG. 13 is drawn by a photolithography method and a reactive ion etching method. Then, an over clad film made of quartz-based glass is formed using the flame hydrolysis depositing method again, thereby manufacturing the broadband wavelength multiplexing and demultiplexing filter 70.

Further, the design values of the respective optical circuits are as follows. In the first-stage and second-stage broadband wavelength multiplexing and demultiplexing filters 72, 74a, and 74b, $\Delta L_0$ of the second phase part 58 is 8.03 μm, $\Delta L_1$ of the phase part 54 is 6.72 μm, the pitch between the directional couplers 56 is 9.4 μm, and the length of the coupling part of the directional coupler 56 is 0 μm. In the first-stage filter circuit 76, $\Delta L_C$ of the third phase part 82 is 2.25 μm, the pitch between the second directional couplers 80 is 9.4 μm, and the length of the coupling part of the second directional coupler 80 is 427 μm. In the second-stage filter circuit 78, $\Delta_{LC}$ of the third phase part 82 is 3.43 μm, the pitch between the second directional couplers 80 is 9.4 μm, and the length of the coupling part of the second directional coupler 80 is 427 μm.

As can be seen from the graph of the wavelength characteristic of transmittance shown in FIG. 16, in all wavelength bands of 1.31 μm (1.26 to 1.36 μm), 1.49 μm (1.48 to 1.50 μm), 1.55 μm (1.55 to 1.56 μm), and 1.65 μm (1.635 to 1.670 μm), an insertion loss is equal to or less than 2.5 dB, and isolation is substantially greater than 40 dB.

Fifth Embodiment

Next, a fifth embodiment of the broadband wavelength multiplexing and demultiplexing filter according to the present invention will be described. The fifth embodiment has a circuit structure shown in FIG. 17 and is different from the fourth embodiment shown in FIG. 13 in that a filter circuit having one-stage structure is used.

Example 5

According to an example 5 of the fifth embodiment, a broadband wavelength multiplexing and demultiplexing filter 90 is formed in the same manner as the example 4. That is, first, a core film made of quartz-based glass obtained by doping $GeO_2$ and an under clad film are formed on a silicon substrate using a flame hydrolysis depositing method.

At that time, the relative index difference Δ is set to 0.8%, and the film thickness of the core is set to 6.5 μm. Subsequently, an optical circuit pattern is transferred to the core through a photo mask on which the broadband wavelength multiplexing and demultiplexing filter 90 shown in FIG. 17 having a circuit structure in which a wavelength band of 1.31 μm and a wavelength band of 1.49 μm are output from the through port and in which a wavelength band of 1.55 μm is output from the cross port is drawn by a photolithography method and a reactive ion etching method. Then, an over clad film made of quartz-based glass is formed using the flame hydrolysis depositing method again, thereby manufacturing the broadband wavelength multiplexing and demultiplexing filter 90.

Further, the design values of the respective optical circuits are as follows. In the first-stage and second-stage broadband wavelength multiplexing and demultiplexing filters 72, 74a, and 74b, $\Delta L_0$ of the second phase part 58 is 3.15 μm, $\Delta L_1$ of the phase part 54 is 10.77 μm, the pitch between the directional couplers 56 is 11.2 μm, and the length of the coupling part of the directional coupler 56 is 423 μm. In the first-stage filter circuit 76, $\Delta L_C$ of the third phase part 82 is 11.79 μm, the pitch between the second directional couplers 80 is 9.4 μm, and the length of the coupling part of the second directional coupler 80 is 566 μm.

Figure 17:
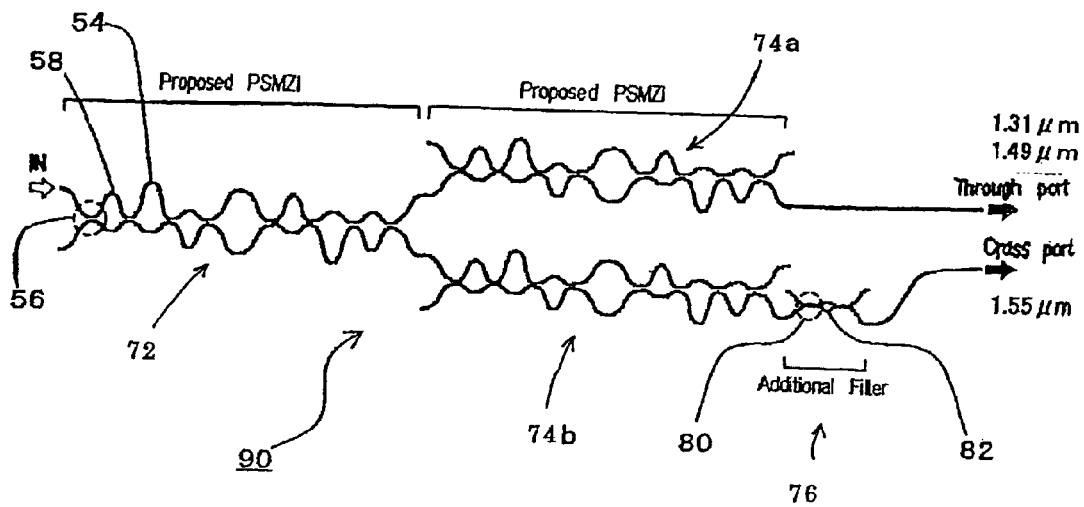
FIG. 17 is an essential constitutional view schematically illustrating a circuit structure of a fifth embodiment of the broadband wavelength multiplexing and demultiplexing filter of the present invention.
Figure 18:
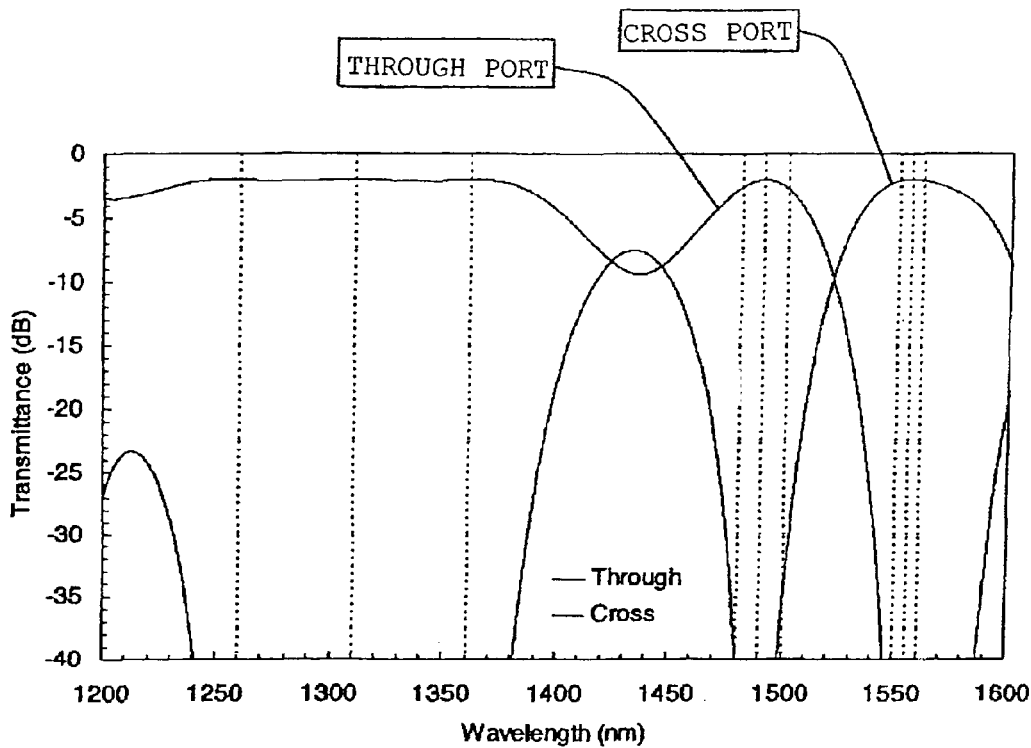
FIG. 18 is a graph showing a wavelength characteristic of the transmittance of the broadband wavelength multiplexing and demultiplexing filter shown in FIG. 17.

FIG. 18 shows the wavelength characteristic of the transmittance of the broadband wavelength multiplexing and demultiplexing filter in FIG. 17 manufactured by the above-mentioned design. As can be seen from the graph shown in FIG. 18, in all wavelength bands of 1.31 μm (1.26 to 1.36 μm), 1.49 μm (1.48 to 1.50 μm), and 1.55 μm (1.55 to 1.56 μm), an insertion loss is equal to or less than 2.0 dB, and isolation is substantially greater than 40 dB.

Sixth Embodiment

Next, a sixth embodiment of the broadband wavelength multiplexing and demultiplexing filter according to the present invention will be described.

Figure 19:
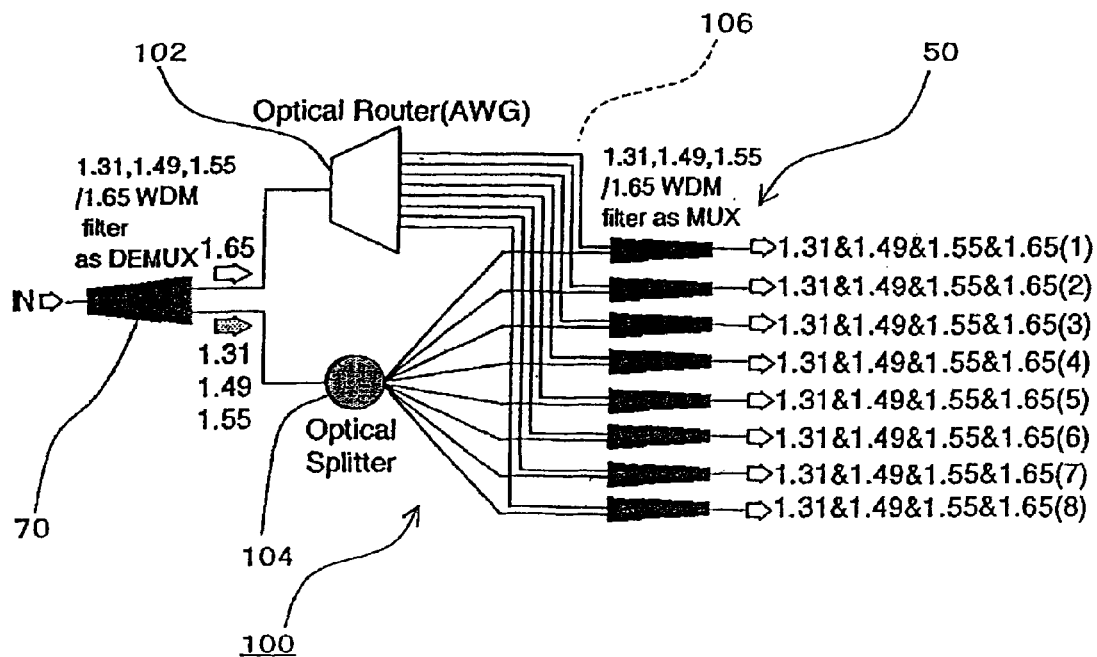
FIG. 19 is an essential constitutional view schematically illustrating a circuit structure of a broadband optical splitter/router of a sixth embodiment using the broadband wavelength multiplexing and demultiplexing filter according to the present invention.

A circuit using the broadband wavelength multiplexing and demultiplexing filter according to the sixth embodiment is a broadband optical splitter/router 100 having a circuit structure shown in FIG. 19. The broadband optical splitter/router 100 is manufactured by transferring an optical circuit pattern on the core through a photo mask having a circuit structure thereon in which the broadband wavelength multiplexing and demultiplexing filters 50 and 70 shown in FIGS. 11 and 13, an array waveguide lattice 102, and an eight-branch optical splitter 104 are formed on a substrate 106 as a monolithic circuit, using a photolithography method and a reactive ion etching method, and by forming an over clad film made of quartz-based glass thereon by using the flame hydrolysis depositing method again.

In the broadband optical splitter/router 100 shown in FIG. 19, first, the input WDM optical signals in the wavelength bands of 1.31 μm, 1.49 μm, 1.55 μm, and 1.65 μm are demultiplexed by the broadband wavelength multiplexing and demultiplexing filter 70. Then, optical signals in the wavelength bands of 1.31 μm, 1.49 μm, and 1.55 μm are split into eight optical signals having the same intensity by the eight-branch optical splitter 104. On the other hand, the optical signal in the wavelength band of 1.65 μm is demultiplexed into eight channels having a wavelength gap of 5 nm by the array waveguide lattice 102, functioning as an optical router. Then, the split optical signals in the wavelength bands of 1.31 μm, 1.49 μm, and 1.55 μm and the split optical signal in the wavelength band of 1.65 μm are multiplexed by the broadband wavelength multiplexing and demultiplexing filter 50 to be output. That is, the broadband wavelength multiplexing and demultiplexing filter 70 shown in FIG. 13 is used for demultiplexing, and the broadband wavelength multiplexing and demultiplexing filter 50 shown in FIG. 11 is used for multiplexing.

Example 6

According to an example 6 of the sixth embodiment, the broadband optical splitter/router 100 shown in FIG. 19 is manufactured in the same manner as that in the above-mentioned examples. In addition, the design values of the respective optical circuits are as follows. In the broadband wavelength multiplexing and demultiplexing filter 70 for demultiplexing, $\Delta L_0$ of the second phase part is 8.03 μm, $\Delta L_1$ of the phase part is 6.72 μm, the pitch between the directional couplers is 11.2 μm, and the length of the coupling part of the directional coupler is 270 μm. In the first-stage filter circuit 76, $\Delta L_C$ of the third phase part is 2.25 μm, the pitch between the second directional couplers is 9.4 μm, and the length of the coupling part of the second directional coupler is 427 μm. In the second-stage filter circuit 78, $\Delta L_C$ of the third phase part is 2.25 μm, the pitch between the directional couplers is 9.4 μm, and the length of the coupling part of the directional coupler is 427 μm. In the broadband wavelength multiplexing and demultiplexing filter 50 for multiplexing, $\Delta L_0$ of the second phase part is 8.03 μm, $\Delta L_1$ of the phase part is 6.72 μm, the pitch between the directional couplers is 11.2 μm, and the length of the coupling part of the directional coupler is 270 μm.

Figure 20A:
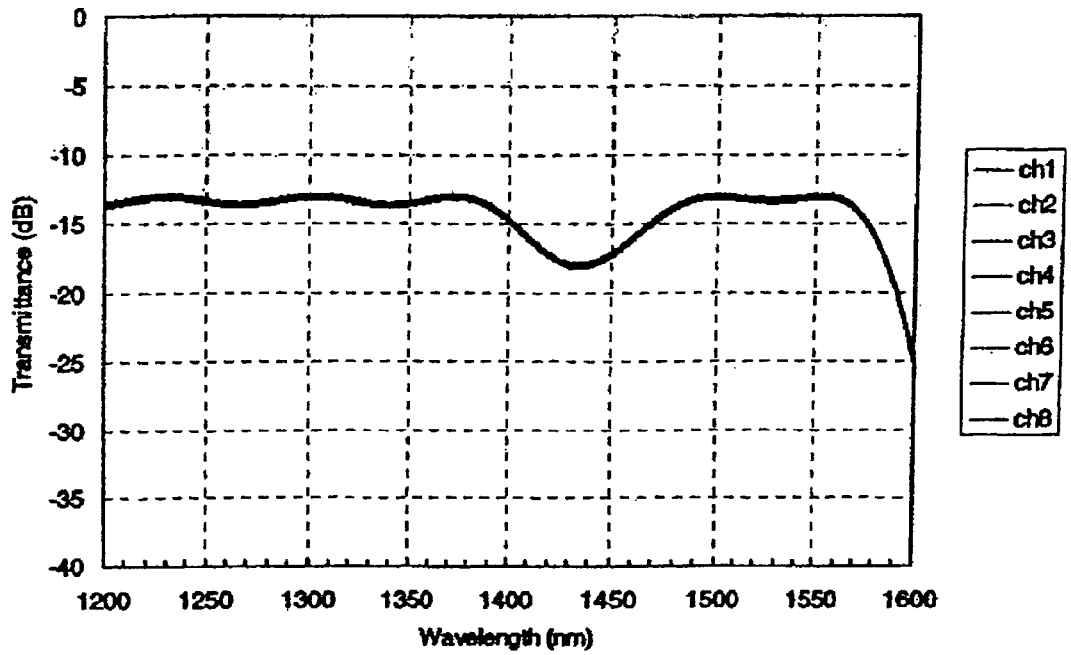
FIG. 20A is a graph showing a transmission characteristic of an optical splitter function of the broadband optical splitter/router shown in FIG. 19.
Figure 20B:
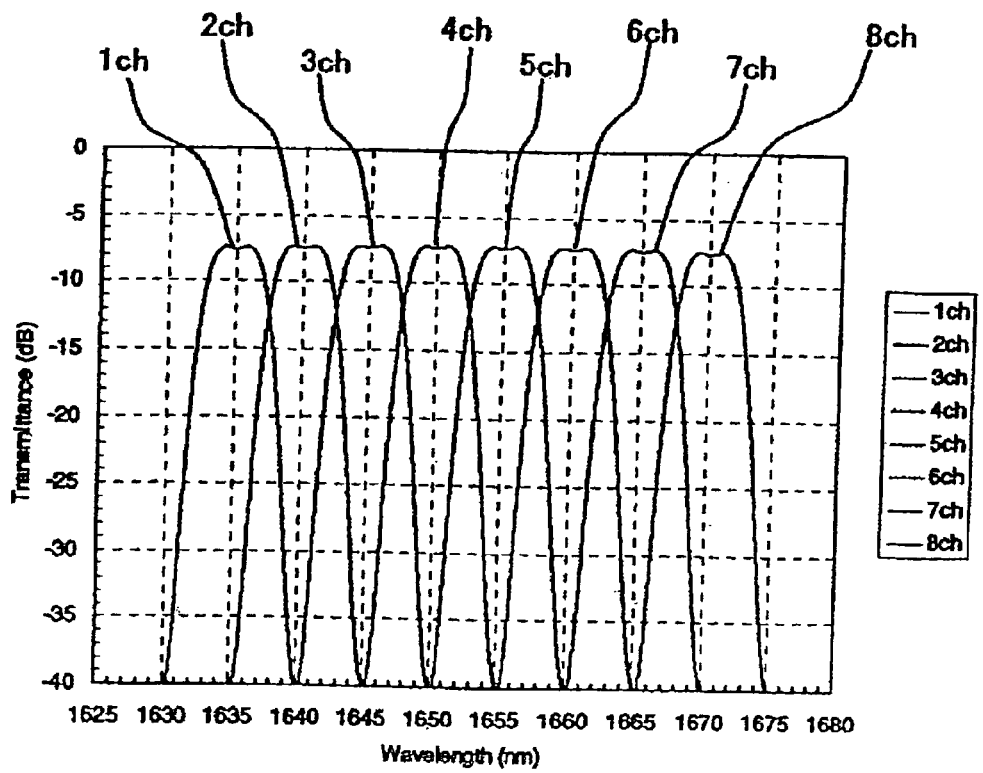
FIG. 20B is a graph showing a transmission characteristic of each channel with respect to an optical router function.

The broadband optical splitter/router 100 is manufactured according to the above-mentioned design, and the wavelength characteristic of the transmittance of the optical signal output from each channel ch is shown in FIGS. 20A and 20B. As can be seen from FIGS. 20A and 20B, in all wavelength bands of 1.31 μm (1.26 to 1.36 μm), 1.49 μm (1.48 to 1.50 μm), and 1.55 μm (1.55 to 1.56 μm), an insertion loss is equal to or less than 12.7 dB. On the other side, in the wavelength band of 1.65 μm (1.635 μm to 1.670 μm), the insertion loss is equal to or less than 7.5 dB, and isolation is substantially greater than 30 dB. As a result, it is possible to realize an optical splitter function in the wavelength bands of 1.31 μm, 1.49 μm, and 1.55 μm, and it is possible to realize an optical router function in the wavelength band of 1.65 μm. Thus, it is possible to realize a high-function device by monolithic-integrating another waveguide circuit part.

Seventh Embodiment

Next, a circuit of a seventh embodiment using the broadband wavelength multiplexing and demultiplexing filter according to the present invention will be described. The circuit of the seventh embodiment is an optical splitter 120 with a broadband wavelength multiplexing and demultiplexing filter function, which has a circuit structure shown in FIG. 21.

In the manufacture of the optical splitter 120, first, a core film made of quartz-based glass in which $TiO_2$ is doped is formed on a quartz glass substrate by a flame hydrolysis depositing method. At that time, the relative index difference Δ is set to 0.4%, and the film thickness of the core is set to 7.0 μm. Subsequently, an optical circuit pattern comprising a circuit pattern of an eight-branch optical splitter 122 for splitting the input optical signal in the wavelength band of 1.55 μm into eight optical signals having the same intensity and a circuit pattern of the broadband wavelength multiplexing and demultiplexing filter 50 is transferred to the core through a photo mask in which a monolithic-integrated circuit structure is drawn on the same substrate, using a photolithography method and a reactive ion etching method. The optical circuit of the broadband wavelength multiplexing and demultiplexing filter 50 is a circuit shown in FIG. 11 which is designed such that optical signals in the wavelength bands of 1.31 μm and 1.49 are output from the through port and an optical signal in the wavelength band of 1.55 μm is output from the cross port. Then, an over clad film made of quartz-based glass is formed by using the flame hydrolysis depositing method again, thereby forming the optical splitter 120.

Example 7

Figure 22:
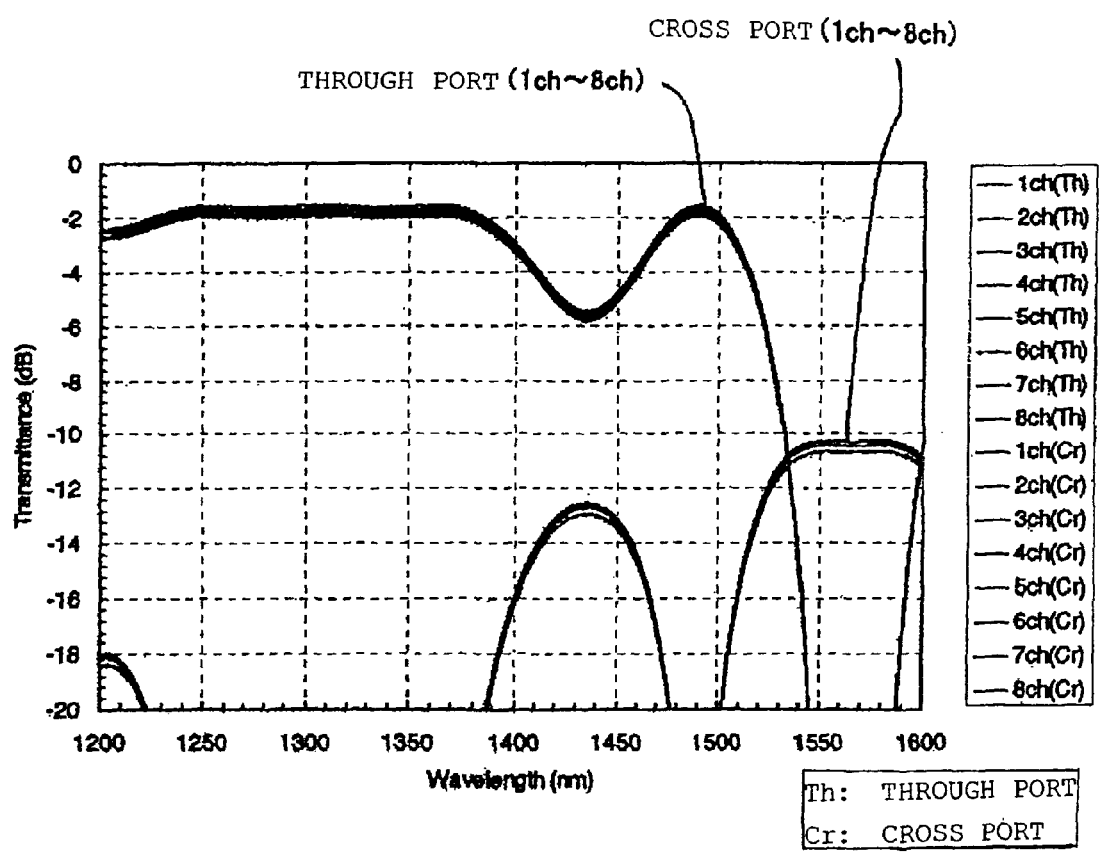
FIG. 22 is a graph showing a wavelength characteristic of the transmittance of the optical splitter with a broadband wavelength multiplexing and demultiplexing filter function shown in FIG. 21.

As an example 7 of the seventh embodiment, FIG. 22 shows the wavelength characteristic of the transmittance of the splitter 120 shown in FIG. 21. Further, the design values of each optical circuit are as follows. In the broadband wavelength multiplexing and demultiplexing filter 50, $\Delta L_0$ of the second phase part is 3.16 μm, $\Delta L_1$ of the phase part is 10.81 μm, the pitch between the directional couplers is 13.6 μm, and the length of the coupling part of the directional coupler is 0 μm. In FIG. 22, 'Th' means the output of the through port, and 'Cr' means the output of the cross port.

As can be seen from FIG. 22, in the wavelength bands of 1.31 μm (1.26 to 1.36 μm) and 1.49 μm (1.48 to 1.50 μm), the insertion loss is equal to or less than 2.0 dB, and in the wavelength band of 1.55 μm (1.55 to 1.56 μm), the insertion loss is equal to or less than 11.0 dB. In addition, as can be seen from FIG. 22, an optical signal in the wavelength band of 1.55 μm is split into eight optical signals having the same intensity, and the split optical signals in the wavelength band of 1.55 μm and the optical signals in the wavelength bands of 1.31 μm and 1.49 μm are multiplexed.

According to the third to seventh embodiments, an optical waveguide circuit is formed on a substrate to form a broadband wavelength multiplexing and demultiplexing filter. In this way, it is possible to easily form a broadband wavelength multiplexing and demultiplexing filter having a wavelength characteristic according to design by the following circuit structure.

That is, in the optical waveguide circuits of the third to seventh embodiments, one or more first phase-part-intervention-type point-symmetrically connected optical interferometer circuits, each formed by accurately point-symmetrically connecting two equal Mach-Zehnder optical interferometer circuits in series on a substrate, are connected to each other in series. The Mach-Zehnder optical interferometer circuit is a phase-part-intervention-type point-symmetrically connected optical interferometer circuit in which two equal optical couplers are accurately point-symmetrically connected to each other in series with a phase part interposed therebetween. Since the optical coupler comprises the same directional coupler and the second phase part having a different length (phase amount) from that between the optical couplers, the optical coupler has high isolation with respect to outputs from both the through port and the cross port, and thus it is possible to form an optical waveguide without using a lens system. Therefore, it is possible to reduce manufacturing costs.

Eighth Embodiment

Figure 28:
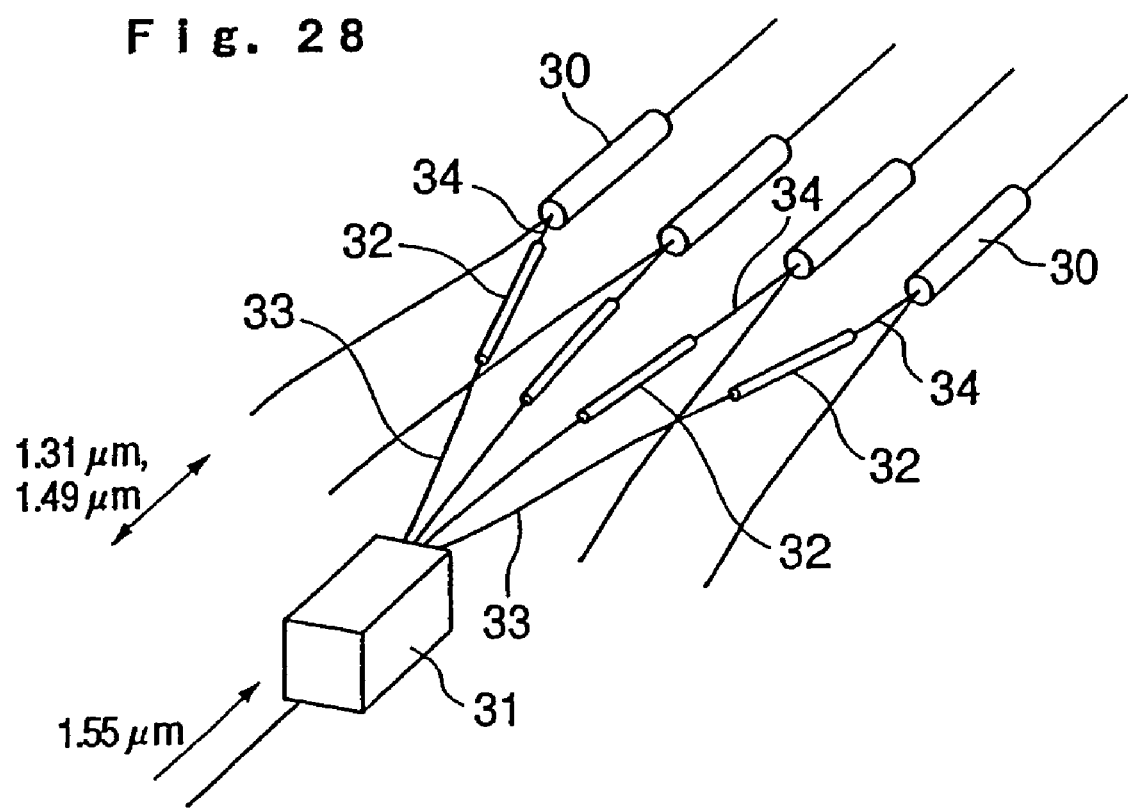
FIG. 28 is an explanatory diagram illustrating the structure of a conventional module applied to the B-PON system.

Next, a circuit of an eighth embodiment according to the present invention will be described. This circuit is an optical coupler circuit having an optical signal multiplexing and demultiplexing function, similar to the seventh embodiment. As shown in FIG. 28, the optical splitter having the optical signal multiplexing and demultiplexing function that is used in the current B-PON system is formed by connecting a filter module 31 having a dielectric multi-layer filter, functioning as an optical signal multiplexing and demultiplexing device, to an optical splitter module 31 using a melting coupler (a melting optical fiber coupler). The filter module 30 and the optical splitter module 31 are connected to each other by connecting optical fibers 33 and 34 formed at light input and output units thereof using a fusing splicing portion 32. In addition, a module having a plane lightwave circuit (PLC) may be used as the optical splitter module.

However, in a conventional example, since the dielectric multi-layer filter module 30 and the optical splitter module 31 are connected to each other by fusion-splicing the terminals of the optical fibers 33 and 34, the size of a module is extremely increased. In particular, in the conventional example, when an image distribution number increases, the structure of a module is complicated, and a size, an accommodation space, and a module cost substantially increase.

The optical splitters with the optical signal multiplexing and demultiplexing function according to the seventh and eighth embodiments of the present invention have a structure for solving the above-mentioned problems. That is, the optical splitter with the optical signal multiplexing and demultiplexing function according to each of the seventh and eighth embodiment has a small size and a simple structure capable of flexibly coping with the increase of the image distribution number, and also has a function of multiplexing and demultiplexing the wavelengths of signals transmitted and received in high-speed data communication and a function of equally distributing image signals.

Figure 23:
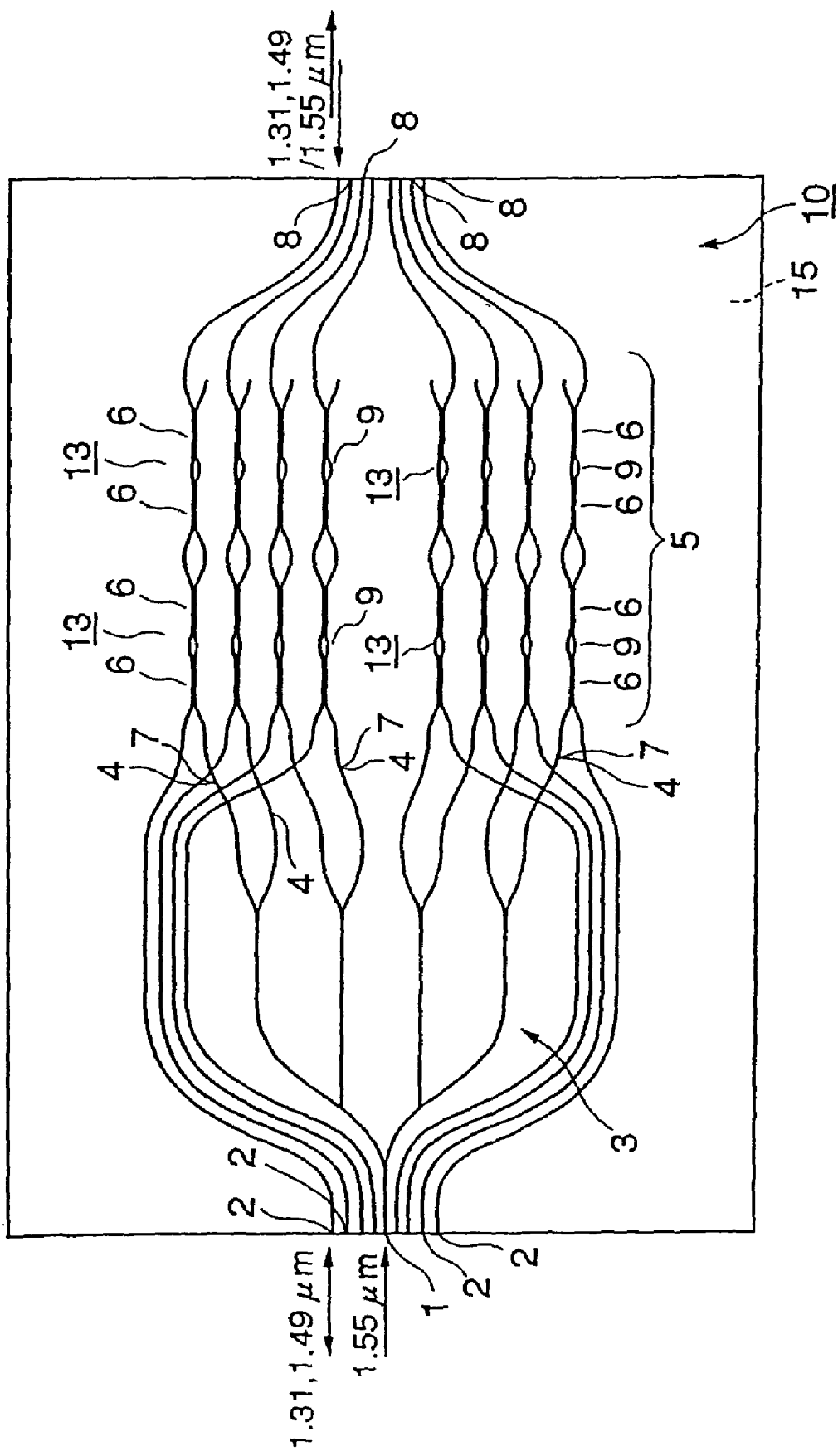
FIG. 23 is an explanatory diagram schematically illustrating a circuit structure of an optical splitter with an optical signal multiplexing and demultiplexing function according to an eighth embodiment of the present invention.

FIG. 23 shows the optical splitter with the optical signal multiplexing and demultiplexing function according to the eighth embodiment of the present invention. As shown in FIG. 23, the optical splitter with the optical signal multiplexing and demultiplexing function according to the eighth embodiment has an optical waveguide circuit 10 formed on a substrate 15. The optical waveguide circuit 10 has an optical splitter 3 for splitting an optical signal input to a light input port 1 arranged at one end of the optical waveguide circuit 10 into a plurality of optical signals having the same intensity and for outputting them from a plurality of light output ports 4.

In the present embodiment, the optical splitter 3 is an eight-branch splitter or a Y-branch splitter. An optical signal input from the light input port 1 is split into eight optical signals, and the split eight signals are respectively output from the light output ports 4. In addition, the optical splitter 3 also has a function of multiplexing signals input from the light output ports 4 and of outputting the multiplexed signal from the light input port 1.

Further, the optical waveguide circuit 10 has a plurality of the optical signal multiplexing and demultiplexing devices 5 arranged in parallel. Each optical signal multiplexing and demultiplexing device 5 comprises two light input ports 2 and 7 and has at least a function of multiplexing optical signals having different wavelengths that are input from the light input ports 2 and 7.

The light input port 7 of each optical signal multiplexing and demultiplexing device 5 is connected to the corresponding light output port 4 of the optical splitter 3, and the other input port 2 of each optical waveguide multiplexing and demultiplexing device 5 is arranged at one end of the optical waveguide circuit 10 to be disposed parallel to the light input port 1 of the light splitter 3. In addition, a multiplexed optical signal output port 8 of each optical signal multiplexing and demultiplexing device 5 is arranged at an end portion (here, the other end) other than the end portion where the light input ports 1 and 2 are arranged in the optical waveguide circuit 10.

Further, each optical signal multiplexing and demultiplexing device 5 also has a function of multiplexing a plurality of optical signals having different wavelengths input from the multiplexed optical signal output port 8 and of respectively outputting the multiplexed optical signals from the light input ports 2 and 7.

FIG. 2 schematically shows the structure of each optical signal multiplexing and demultiplexing device 5 according to the present embodiment. Since the optical signal multiplexing and demultiplexing device 5 is the same as the point-symmetrically connected optical interferometer circuit 5 constituting the light input side circuit shown in FIG. 1, a description thereof will be omitted for the simplicity of explanation.

In the optical signal multiplexing and demultiplexing device 5, as described above, the transmittance $T_{CR}$ of light output from the cross port is obtained by Expressions (1), (2), and (3).

The optical signals in the wavelength bands of 1.31 μm, 1.49 μm, and 1.55 μm are input to the IN port. Then, among them, the optical signals in the wavelength bands of 1.31 μm and 1.49 μm are output from the through port, and the optical signal in the wavelength band of 1.55 μm is output from the cross port.

In this case, when C is zero for the respective central wavelengths of two of the three wavelength bands, $T_{CR}$ becomes zero for these wavelength bands. Therefore, transmittance when optical signals in these wavelength bands are output from the through port is 1 from the relationship $1-T_{CR}=1$. Thus, two specified wavelengths are output from the through port.

Here, since C is zero for two wavelengths, the relationship $\cos^2(\Delta\Psi/2)=0$ is established in Expression (2). For example, $\Delta L_C$ is determined to satisfy $\Delta\Psi/2=(2m+3)\pi$ at the wavelength of 1.31 μm and $\Delta\Omega/2=(2m+1)$ it at the wavelength of 1.49 μm.

Next, at a wavelength of 1.55 μm, $T_{CR}$ is 1, and the cross port 19 is broadband. Therefore, C is set to about 0.5 for the wavelength of 1.55 μm. The K value of the directional coupler 6 is calculated to satisfy the above-mentioned relationship.

Finally, since the wavelength band of 1.31 μm is the widest transmission band, it is possible to widen a wavelength band by setting the value of K to about zero or 1 (100%) at the wavelength of 1.31 μm, which is the central wavelength thereof.

For example, when manufacturing a quartz-based optical waveguide circuit having a relative index difference Δ of 0.45% and a size of 7.5×7.5 μm, the value of $\Delta L_C$ calculated according to the above-mentioned process is 7.71 μm, and the coupling efficiency K of the directional coupler at the wavelength of 1.31 μm is about zero or 1. In addition, the coupling efficiency K of the directional coupler at the wavelength of 1.55 μm is about 0.77.

Any type of directional coupler 6 will be used if satisfying the above-mentioned conditions. However, in general, the directional coupler having a short coupling part in length is manufactured with a low error rate. Therefore, it is preferable that the length of the coupling part of the directional coupler 6 shown in FIG. 3 be short.

That is, for example, the length of the coupling part of the directional coupler 6 satisfying the above-mentioned conditions is 924 μm or 2184 μm. As shown in FIGS. 4A and 4B, even when the length of the coupling part of the directional coupler 6 is 924 μm (FIG. 4A) or 2184 μm (FIG. 4B), the above-mentioned conditions are satisfied. In this case, it is preferable that the length of the coupling part of the directional coupler 6 be 924 μm since it is expected that manufacturing errors decrease.

Further, in the eighth embodiment, in each optical signal multiplexing and demultiplexing device 5, the directional coupler 6 is formed such that the length of the coupling part thereof is 924 μm. In addition, in the wavelength characteristics shown in FIG. 4A, the coupling efficiency K of the directional coupler 6 is set to about 1 at a wavelength of 1.31 μm, and a differential coefficient dK/dλ of the coupling efficiency K with respect to a wavelength of 1.55 μm is set to satisfy dK/dλ<0. The optical signal multiplexing and demultiplexing device 5 according to the eighth embodiment is formed as described above, and thus can realize good characteristics capable of satisfying characteristics required for the respective wavelength bands of 1.31 μm, 1.49 μm, and 1.55 μm.

Since the broad band multiplexing and demultiplexing device (the broadband optical signal multiplexing and demultiplexing filter) can be constructed as described above and the optical signal multiplexing and demultiplexing device 5 having the above-mentioned structure is connected to the optical splitter 3 in the eighth embodiment, it is possible to form an optical splitter having an optical signal multiplexing and demultiplexing function for performing optical multiplexing and demultiplexing on a desired wavelength with a lower loss.

For example, in the eighth embodiment, when optical signals in a wavelength band of 1.55 μm are input to the light input port 1 of the optical splitter 3, the optical signals are split by the optical splitter 3, and the split optical signals are input to the optical signal multiplexing and demultiplexing device 5 through the light input port 7 of the optical signal multiplexing and demultiplexing device 5. Since the multiplexed optical signal output port 8 is a cross port with respect to the light input port 7, it is possible to output optical signals in the wavelength band of 1.55 μm from the demultiplexed optical signal output port 8 with low loss by the above-mentioned characteristics of the optical signal multiplexing and demultiplexing device 5.

When optical signals in a wavelength band of 1.31 μm and a wavelength band of 1.49μ are input from the light input port 2 of the optical signal multiplexing and demultiplexing device 5, the optical signals in these wavelength bands of 1.31 μm and 1.49 μm and the optical signal in the wavelength band of 1.55 μm are multiplexed with each other by the optical signal multiplexing and demultiplexing device 5. Since the multiplexed optical signal output port 8 is a through port with respect to the light input port 2, it is possible to output the optical signals in the wavelength bands of 1.31 μm and 1.49 μm from the multiplexed optical signal output port 8 with low loss by the above-mentioned characteristics of the optical signal multiplexing and demultiplexing device 5. As a result, it is possible to output the optical signal obtained by multiplexing the optical signals in the wavelength bands of 1.31 μm, 1.49 μm, and 1.55 μm from the multiplexed optical signal output port 8 with low loss.

Moreover, contrary to the above, when the optical signals in the wavelength bands of 1.31 μm, 1.49 μm, and 1.55 μm are input from the multiplexed optical signal output port 8, through a course contrary to the above, the optical signals in the wavelength bands 1.31 μm and 1.49 μm can be output from the light input port 2 of the optical signal multiplexing and demultiplexing device 5 formed at one end of the optical waveguide circuit 10 with low loss, and the optical signal in the wavelength of 1.55 μm can be output from the light input port 1 of the optical splitter 3 with low loss.

Further, in the eighth embodiment, as shown in FIG. 23, it is possible to construct a compact circuit, similar to the circuit shown in FIG. 21, by arranging the optical signal multiplexing and demultiplexing device 5 in an array shape and by connecting it to the optical splitter 3 on the same substrate using the waveguide. That is, in the eighth embodiment, a module is 8 mm wide, 60 mm long, and 70 mm high, which is about half of the conventional module that is 20 mm wide, 120 mm long, and 20 mm high. Therefore, it is possible to decrease the size of a module.

Furthermore, the optical waveguide circuit 10 according to the eighth embodiment has a cross waveguide therein. However, it is possible to minimize the leakage of light to other channels by properly designing the layout of an optical circuit (for example, a crossed angle is set to be larger than 20°) (which is similarly applied to the circuit shown in FIG. 21).

Moreover, the size reduction effect (achievement of a small size) by the seventh and eighth embodiments is more remarkably obtained when the distribution number of signals increases. As a result, an accommodation space is reduced, and it is possible to cope with an increase in the number of channels without a sharp increase in cost.

Example 8

As an example 8 of the eighth embodiment, an optical splitter with a function of multiplexing and demultiplexing an optical signal is manufactured as follows. First, an under clad film made of quartz-based glass and a $TiO_2$-doped core film are formed on a silicon substrate using a flame hydrolysis depositing method. At that time, the relative index difference $\Delta$ of the core to the clad is set to 0.45%, and the thickness of each film is set to 7.5 μm.

Subsequently, an optical circuit pattern is transferred to the core through a photo mask on which a circuit of the optical splitter with an optical signal multiplexing and demultiplexing function shown in FIG. 23 is drawn, by a photolithography method and a reactive ion etching method. Then, an over clad film made of quartz-based glass is formed using the flame hydrolysis depositing method again. In this way, the optical splitter with an optical signal multiplexing and demultiplexing function is manufactured by forming the circuit structure shown in FIG. 23 with the optical waveguide of the core.

For example, the width of the core constituting the optical waveguide circuit is 7.5 μm, and the thickness of the core is also 7.5 μm. $\Delta L_C$ of the directional coupler is set to 7.71 μm, the pitch between the directional couplers 6 (as shown in FIG. 3, the distance between the center of the first optical waveguide 11 and the center of the second optical waveguide 12) is set to 11.1 μm, and the length of the coupling part of the directional coupler is set to 924 μm.

Figure 24:
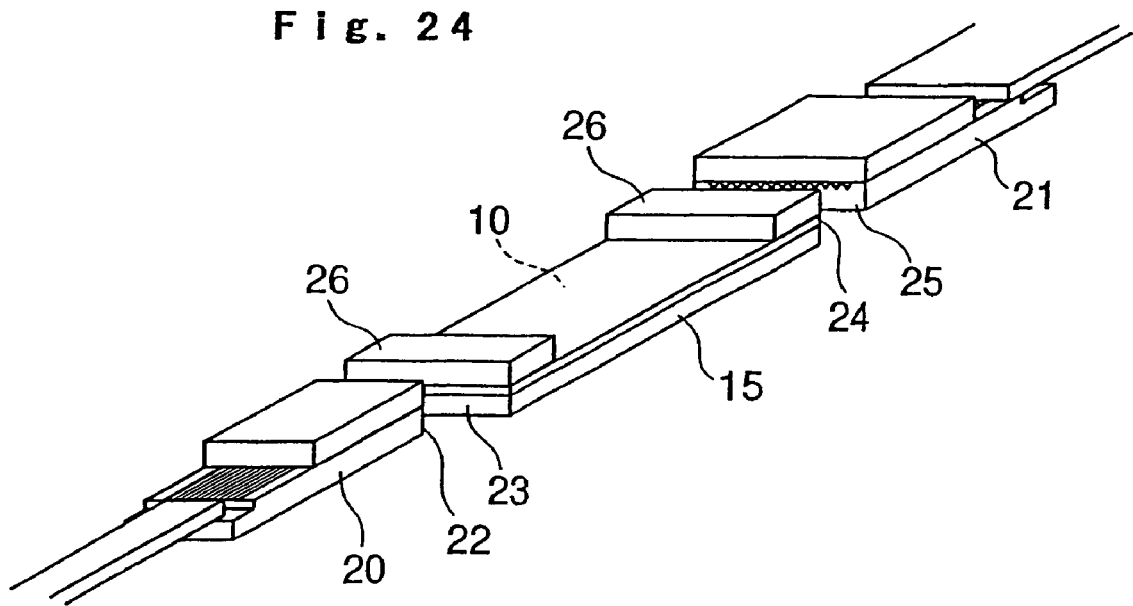
FIG. 24 is an explanatory diagram illustrating an optical module formed by applying the optical splitter with an optical signal multiplexing and demultiplexing function of the eighth embodiment.

Then, the optical splitter with an optical signal multiplexing and demultiplexing function is cut into a predetermined size (for example, a width of 4.7 mm, a length of 47 mm, and a height of 1 mm) by a dicing machine. Subsequently, as shown in FIG. 24, optical fiber arrays 20 and 21 are connected to both ends of the optical waveguide circuit, and they are integrated into a package, thereby forming an optical module. The module has a size of, for example, a width of 8 mm, a length of 60 mm, and a height of 7 mm. Further, the structure of the optical waveguide circuit 10 is not shown in FIG. 24. In FIG. 24, reference numeral '26' indicates an upper plate, and reference numerals '22', '23', '24', and '25' indicate connection end surfaces. In addition, the connection end surfaces 22 and 23 opposite to each other are connected, and the connection end surfaces 24 and 25 opposite to each other are connected.

Figure 25:
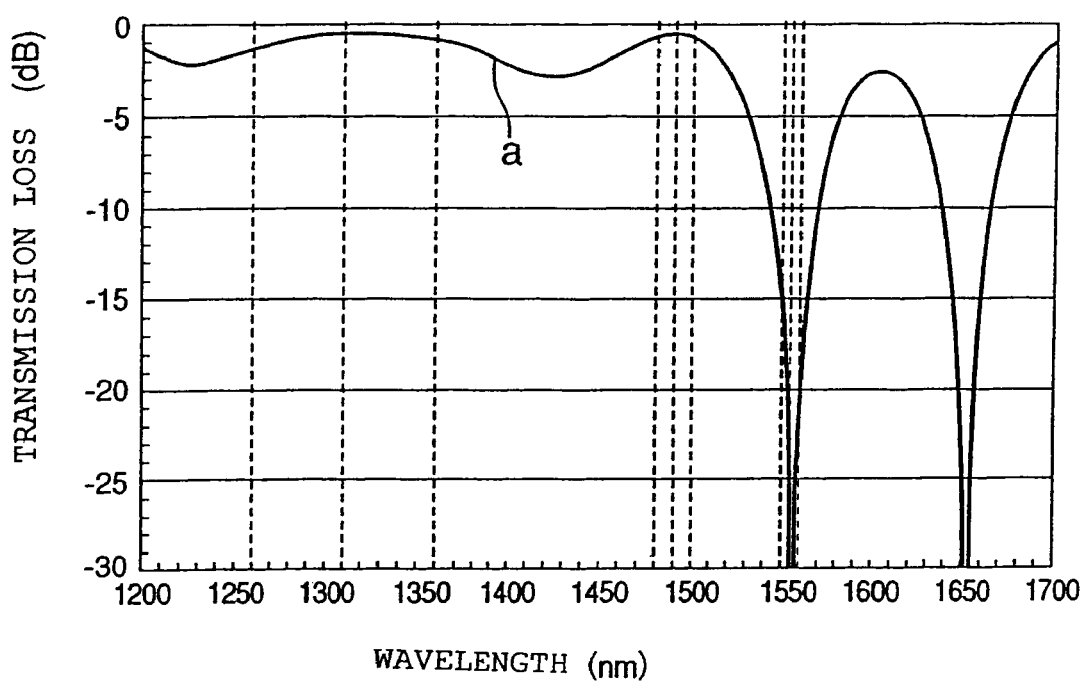
FIG. 25 is a graph showing a transmission loss characteristic of an optical signal input from one of input ports of an optical signal multiplexing and demultiplexing device provided at one end side of an optical waveguide circuit, in the optical splitter with an optical signal multiplexing and demultiplexing function of the eighth embodiment.

The characteristics of the optical splitter with an optical signal multiplexing and demultiplexing function according to the example 8 is as follows. That is, for the respective optical signals having wavelengths of 1.31 μm and 1.49 μm that are input from the light input port 2, the insertion loss is about 0.7 dB, and a PDL (polarization dependence loss) is about 0.2 dB. The insertion loss of the optical signal having a wavelength of 1.55 μm input from the light input port 1 is about 10.7 dB, and the PDL thereof is about 0.2 dB. In addition, the reflection attenuation amount of optical signals input from the respective light input ports 1 and 2 is smaller than 40 dB. Further, the transmission loss characteristic (wavelength characteristic) of the optical signal input from the light input port 2 is represented by a characteristic line a in FIG. 25.

As can be seen from these results, the example 8 has characteristics corresponding to design values, and thus the validity of design is established.

Furthermore, the broadband wavelength multiplexing and demultiplexing filter of the present invention is not limited to the respective embodiments, and various modifications and changes can be made. For example, in the examples 1 and 2, the relative index difference $\Delta$ of the core to the clad is set to 0.45% or 0.3%. However, the relative index difference $\Delta$ may be other values. For example, the value may be 0.80%.

Moreover, the length of the coupler part of the directional coupler 6 of the Mach-Zehnder optical interferometer circuit 13 and the pitch between the directional couplers are not limited to specific values, but may be properly set to correspond to the required wavelength characteristic.

Further, in the first and second embodiments, the light input side circuit 1 and the first light output side circuit have the point-symmetrically connected optical interferometer circuits 5 and 7, respectively. However, at least one of the light input side circuit 1 and the first light output side circuit 2 may be formed by connecting two or more point-symmetrically connected interferometer circuits in series.

Furthermore, the second light output side circuit 3 has the two-stage Mach-Zehnder optical interferometer circuits 13c and 13d in the first embodiment, and has the one-stage point-symmetrically connected interferometer circuit 8 and the Mach-Zehnder optical interferometer circuit 13d connected to the next stage thereof in the second embodiment. However, the number of stages of the Mach-Zehnder optical interferometer circuit 13 and the number of stages of the point-symmetrically connected optical interferometer circuit 8 constituting the second light output side circuit 3 are not particularly limited thereto, but may be properly set.

Moreover, in the respective embodiments, the broadband wavelength multiplexing and demultiplexing filter comprises one light input terminal 17 and two light output terminals. However, a broadband wavelength multiplexing and demultiplexing filter having an alternative structure of the present invention can be formed by arranging a plurality of broadband wavelength multiplexing and demultiplexing filter circuits each having one light input terminal 17 and two light output terminals in an array shape. The broadband wavelength multiplexing and demultiplexing filter having the alternative structure has a plurality of light input terminals 17 and light output terminals corresponding to the number of the light input terminals 17.

According to this structure, it is possible to realize a broadband wavelength multiplexing and demultiplexing filter capable of reliably multiplexing and demultiplexing optical signals having a larger number of wavelengths with high isolation, by arranging a plurality of broadband wavelength multiplexing and demultiplexing filters capable of exhibiting the above-mentioned excellent effects.

Further, as described above, optical signals having a plurality of wavelength input from one light input terminal 17 are demultiplexed, and the demultiplexed optical signals are output from the through port and the cross port. To the contrary, optical signals having different wavelengths may be respectively input from the through port 28 and cross port at the light output side, and output from the light input terminal 17 through a course opposite to the above.

Furthermore, in the eighth embodiment, the relative index difference $\Delta$ of the core to the clad is set to 0.45%. However, the relative index difference $\Delta$ may be other values. For example, the value may be 0.80% or 0.30%.

Moreover, in the seventh and eighth embodiments, the branch number of each of the optical splitters 122 and 3 is eight (an eight-branch splitter). However, the branch number of each of the optical splitters 122 and 3 is not limited thereto, and may be properly set. For example, the optical waveguide circuit 10 can be formed of a four-branch splitter, a sixteen-branch splitter, or a thirty-two-branch splitter.

Further, in the above-mentioned embodiments, the length of the coupling part of the directional coupler 6 of the optical signal multiplexing and demultiplexing device 5 is set to 924 μm. However, under the wavelength multiplexing and demultiplexing conditions of the above-mentioned embodiments, the length of the coupling part may be, for example, 2184 μm or other values, and may be properly set corresponding to the wavelength multiplexing and demultiplexing conditions (for example, multiplexing and demultiplexing wavelengths) required for the optical splitter with an optical signal multiplexing and demultiplexing function.

Furthermore, in the above-mentioned embodiments, the multiplexed optical signal output port 8 of the optical signal multiplexing and demultiplexing device 5 is provided at the other end side of the optical waveguide circuit 10. However, the multiplexed optical signal output port 8 may be formed at a different end from an area where the light input ports 1 and 2 are arranged.

Moreover, in the above-mentioned embodiments, the optical signal multiplexing and demultiplexing device 5 is formed by connecting two Mach-Zehnder optical interferometer circuits 13 in series. However, the optical signal multiplexing and demultiplexing device 5 may be formed of one Mach-Zehnder optical interferometer circuit 13. Therefore, when two Mach-Zehnder optical interferometer circuits 13 having the connection structure as in the above-mentioned embodiments are provided to form the optical signal multiplexing and demultiplexing device 5, it is possible to widen the pass band width of a plurality of wavelengths multiplexed and demultiplexed by the optical signal multiplexing and demultiplexing device 5, which is more preferable.

INDUSTRIAL APPLICABILITY

As described above, a broadband wavelength multiplexing and demultiplexing filter and an optical splitter with an optical signal multiplexing and demultiplexing function according to the present invention are used for various purposes of multiplexing and demultiplexing (distributing) optical signals having a plurality of wavelengths in an optical communication field. In particular, these devices are suitably applied to a process of multiplexing and demultiplexing optical signals in a B-PON system.

The invention claimed is:

1. A broadband optical splitter/router comprising:
an optical signal input port;
a first broadband wavelength multiplexing and demultiplexing filter;
an array waveguide grating;
an optical splitter; and
a second broadband wavelength multiplexing and demultiplexing filter, wherein,
optical signals having a plurality of wavelengths input from the optical signal input port are demultiplexed into optical signals in a predetermined wavelength band by the first broadband wavelength multiplexing and demultiplexing filter,
optical signals in a first wavelength band among the demultiplexed optical signals are split into optical signals having substantially the same intensity by the optical splitter,
optical signals in a second wavelength band among the demultiplexed optical signals are demultiplexed into optical signals having a predetermined wavelength spacing by the array waveguide grating, and
the split optical signals in the first wavelength band and the demultiplexed optical signals in the second wavelength band are multiplexed by the second broadband wavelength multiplexing and demultiplexing filter.

2. The broadband optical splitter/router according to claim 1,
wherein the first broadband wavelength multiplexing and demultiplexing filter comprises:
a phase-part-intervention-type point-symmetrically connected optical interferometer circuit formed by point-symmetrically arranging two equal Mach-Zehnder optical interferometer circuits in series and connecting them to each other with a phase part for generating a phase change interposed therebetween wherein the Mach-Zehnder optical interferometer circuits are composed of optical couplers, formed by a first optical waveguide and a second optical waveguide provided in parallel to each other with a spacing therebetween and two equal directional couplers; and
filter circuits, wherein,
two equal phase-part-intervention-type point-symmetrically connected optical interferometer circuits being accurately point-symmetrically connected in series to each other with a second phase part for generating a phase change different from that in the phase part interposed therebetween,
a light input terminal of the first optical waveguide of the phase-part-intervention-type point-symmetrically connected optical interferometer circuit is composed of the optical signal input port, and an output terminal of the first optical waveguide is composed of a through port,
an output terminal of the second optical waveguide of the phase-part-intervention-type point-symmetrically connected optical interferometer circuit is composed of a cross port,
one or more phase-part-intervention-type point-symmetrically connected optical interferometer circuits having the same structure are connected in series to the through port, and
one or more phase-part-intervention-type point-symmetrically connected optical interferometer circuits having the same structure and one or more filter circuits are connected in series to the cross port of the phase-part-intervention-type point-symmetrically connected optical interferometer circuit.

3. The broadband optical splitter/router according to claim 1,
wherein the second broadband wavelength multiplexing and demultiplexing filter comprises:
a phase-part-intervention-type point-symmetrically connected optical interferometer circuit formed by point-symmetrically arranging two equal Mach-Zehnder optical interferometer circuits in series and connecting them to each other with a phase part for generating a phase change interposed therebetween wherein the Mach-Zehnder optical interferometer circuits are composed of optical couplers, formed by a first optical waveguide and a second optical waveguide provided in parallel to each other with a spacing therebetween and two equal directional couplers, wherein two equal phase-part-intervention-type point-symmetrically connected optical interferometer circuits being accurately point-symmetrically connected in series to each other with a second phase part for generating a phase change different from that in the phase part interposed therebetween.

4. The broadband optical splitter/router according to claim 2, wherein, in the first broadband wavelength multiplexing and demultiplexing filter, an optical signal input to the optical signal input port and then output from the through port passes through only the optical waveguide at the through port side of each phase-part-intervention-type point-symmetrically connected optical interferometer circuit.

5. The broadband optical splitter/router according to claim 2, wherein, the filter circuit of the first broadband wavelength multiplexing and demultiplexing filter comprises a second directional coupler and a third phase part connected in series to each other, the second directional coupler is different from the directional coupler of the phase-part-intervention-type point-symmetrically connected optical interferometer circuit in coupling efficiency, and the third phase part is different from the second phase part in length.

6. The broadband optical splitter/router according to claim 2, wherein, in the first broadband wavelength multiplexing and demultiplexing filter, the optical signal input to the optical signal input port and then output from the cross port passes through only the optical waveguide at the cross port side of each phase-part-intervention-type point-symmetrically connected optical interferometer circuit.

7. The broadband optical splitter/router according to claim 2, wherein a wavelength band where a transmittance of the filter circuit provided at the cross port side of the first broadband wavelength multiplexing and demultiplexing filter is decreased to form a valley-shaped spectrum is equal to a wavelength band where a transmittance of the phase-part-intervention-type point-symmetrically connected optical interferometer circuit provided at the through port side is decreased to form a valley-shaped spectrum.

8. The broadband optical splitter/router according to claim 2, wherein a wavelength band where a transmittance of the filter circuit provided at the cross port side of the first broadband wavelength multiplexing and demultiplexing filter is decreased to form a valley-shaped spectrum is equal to a wavelength band where a transmittance of the phase-part-intervention-type point-symmetrically connected optical interferometer circuit provided at the through port side is increased to form a mountain-shaped spectrum.

* * * * *